United States Patent [19]

Denneau et al.

[11] Patent Number: 5,371,733
[45] Date of Patent: Dec. 6, 1994

[54] METHOD AND APPARATUS FOR CENTRALIZED DETERMINATION OF VIRTUAL TRANSMISSION DELAYS IN NETWORKS OF COUNTER-SYNCHRONIZED COMMUNICATION DEVICES

[75] Inventors: Monty M. Denneau, Brewster; Bruce D. Gavril, Chappaqua; Peter H. Hochschild, New York, all of N.Y.; Craig B. Stunkel, Bethel, Conn.

[73] Assignee: International Business Machines Corporation, Armonk, N.Y.

[21] Appl. No.: 26,386

[22] Filed: Mar. 4, 1993

[51] Int. Cl.⁵ .............................. H04J 1/16
[52] U.S. Cl. ........................... 370/17; 370/13
[58] Field of Search ............. 370/17, 13, 60, 94.1, 370/94.3, 15, 85.12, 85.13, 85.14, 85.15, 108, 105.1, 100.1; 340/825.01, 825.02; 371/34; 375/111

[56] References Cited

U.S. PATENT DOCUMENTS 4,510,600  4/1985  Tan ............................. 370/94.1
4,569,042  2/1986  Larson ......................... 370/13

FOREIGN PATENT DOCUMENTS 1136864  12/1982  Canada.
1158739  12/1983  Canada.

OTHER PUBLICATIONS

Denneau, Monty M., et al. "Synchronous Communication System Having Multiplexed Information Transfer and Transistion Phases". U.S. patent application Ser. No. 992,200, filed on Dec. 17, 1992.

Primary Examiner—Douglas W. Olms
Assistant Examiner—Dang Ton
Attorney, Agent, or Firm—Marc D. Schechter; Robert P. Tassinari, Jr.

[57] ABSTRACT

For use by a particular node within a digital data communications network having a plurality of counter-synchronized nodes including the particular node, called the central service node (CSN), and at least one remote node, all nodes being clocked at a common frequency, each node being synchronized by its own nodal time counter and connected to at least one other node by at least one transmission segment that completes a transmission path from the CSN, method and apparatus for: (a) establishing any value of virtual transmission delay (vtd) at individual transmission segments; (b) non-destructively determining the existing vtd at individual transmission segments; and (c) establishing basal distributions of vtd throughout the network and determining the elements thereof, (a), (b), and (c) being achieved without the central service node knowing real transmission delay (rtd) and inter-nodal asynchrony anywhere within the network and without requiring the active participation of any remote node. Virtual transmission delay for a transmission segment is the algebraic difference between rtd and the asynchrony between its source and destination nodes. It is the fundamental parameter governing the synchronization of nodal counters and inter-nodal information transfer.

19 Claims, 20 Drawing Sheets

FIG. 3
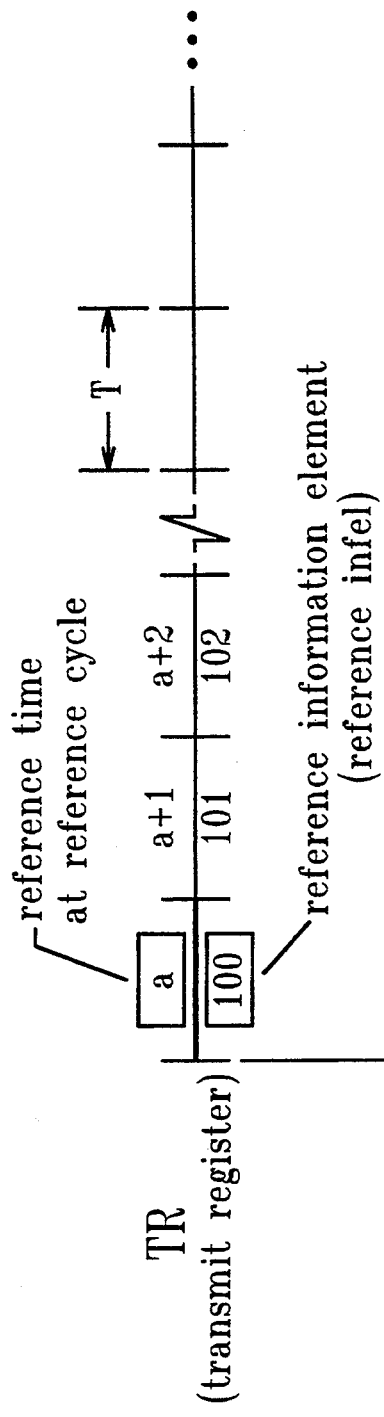
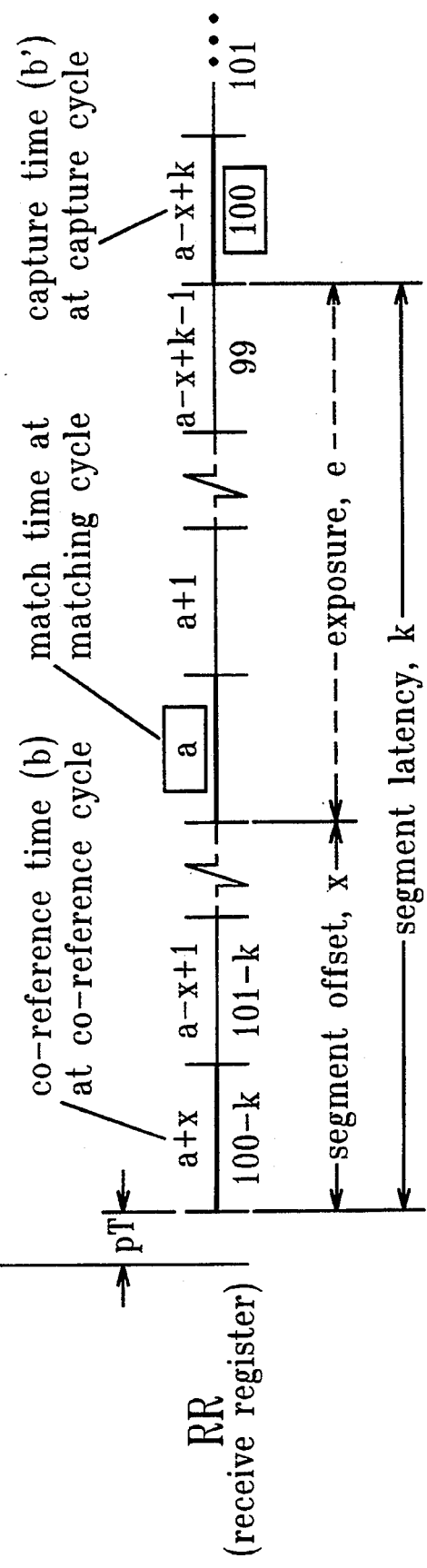

$K \equiv k+k'$ $K \equiv k + k'$

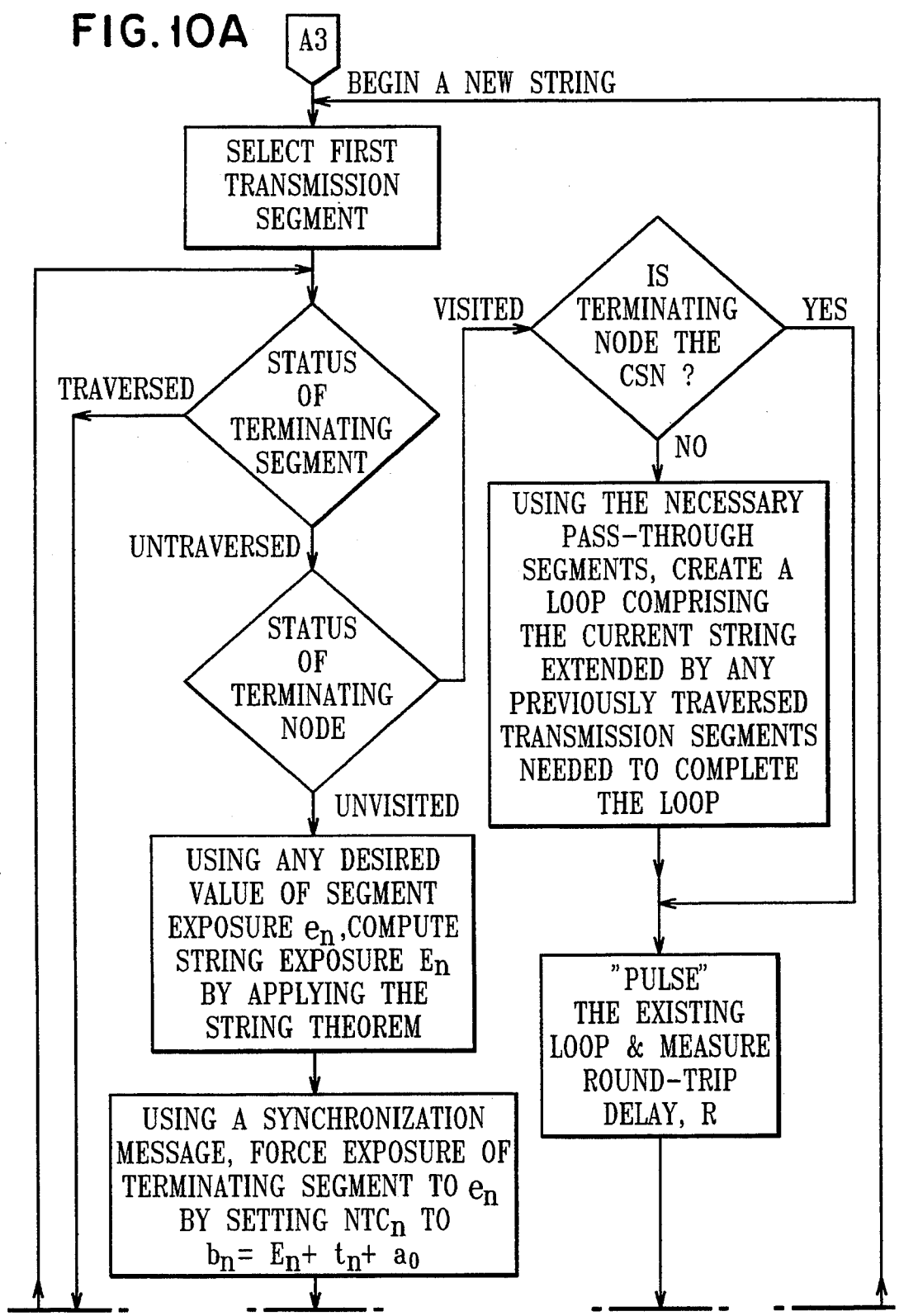

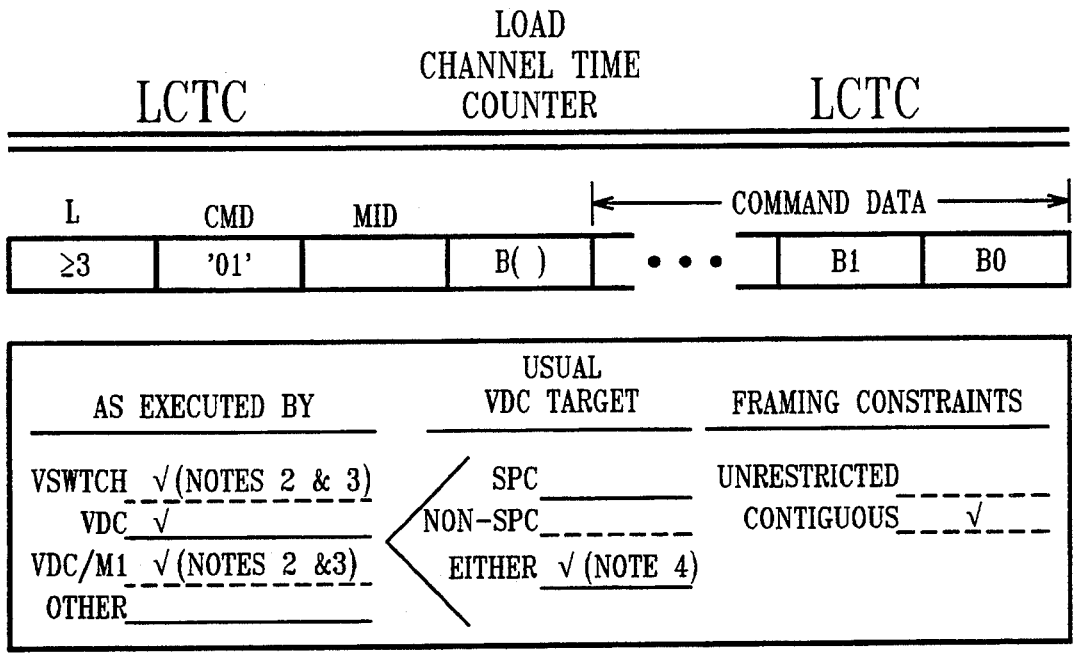

SYNOPSIS:

THE CTC IS LOADED OR RESET.

EXECUTION:

THE COMMAND DATA BYTES REPLACE THE CORRESPONDING BYTES OF THE CTC. B0 CORRESPONDS TO THE LOW-ORDER BYTE POSITION OF THE REGISTER.

IF THE NUMBER OF BYTES OF COMMAND DATA EXCEED THE CAPACITY OF THE CTC, THE EXCESS BYTES ARE IGNORED. IF THE NUMBER OF BYTES OF COMMAND DATA ARE FEWER THAN THE CAPACITY OF THE CTC, THE EXISTING CONTENT OF THE HIGH-ORDER, UNMATCHED BYTES OF THE CTC ARE RESET. IF L=3, THE ONLY EFFECT IS TO RESET THE CTC.

MESSAGE HANDLING TIME, FROM ARRIVAL OF FIRST BYTE TO COMPLETION OF LOADING THE CTC, MUST BE INVARIANT AND DETERMINABLE FOR ANY IMPLEMENTATION. UPON COMPLETION OF LOADING THE CTC, COUNTING IS RESUMED IN THE NEXT CLOCK CYCLE.

MESSAGE-SPECIFIC STATUS INDICATIONS:

INDICATIONS PECULIAR TO CONTIGUOUS MESSAGE TRANSFER.

FIG.16

NOTATION:

→b→ DENOTES THE BYTE SEGMENT OF A SINGLE ELEMENT

THEN 14 AND 15, ETC....

- SOLID ARROW DENOTES THE BYTE SEGMENT OF AN ALREADY TRAVERSED STAGE

- DASHED ARROW DENOTES THE BYTE SEGMENT OF A YET UNTRAVERSED STAGE

- TOKEN SEGMENTS (RUNNING IN OPPOSITE DIRECTIONS) ARE NOT SHOWN, BUT ARE IMPLIED

METHOD AND APPARATUS FOR CENTRALIZED DETERMINATION OF VIRTUAL TRANSMISSION DELAYS IN NETWORKS OF COUNTER-SYNCHRONIZED COMMUNICATION DEVICES

BACKGROUND OF THE INVENTION

This invention relates to synchronous communication networks and, in particular, to the determination of transmission delays between the spatially distributed nodes of such networks.

In a massively parallel processing system, a large number of processing nodes can be interconnected and operated as a single, coherent computing machine.

The switching network in a massively parallel processing system may comprise a multitude of identical integrated-circuit switch elements that are interconnected to provide a high-bandwidth, low-latency, synchronous communication path between any pair of processing nodes. The number of switch elements needed to implement an omega network topology, for example, varies as $$(N/n)\log_n N$$

where N denotes the number of processing nodes and n is the fan out of the switch element. Thus, for a design in which n=4, the number of switch elements needed for a 16,384-node system is 28,672. And, to further emphasize the size and complexity of these networks, it may be noted that each switch element is generally connected to 2n other switch elements, resulting in a layout and wiring problem of large proportions. Understandably, such networks can be difficult to design, develop and initialize, and they can also make the diagnosis of hardware/software failures a challenging task. Equally understandable, therefore, anything that can be done to reduce this complexity would be advantageous.

Phase multiplexing is the seamless interleaving of different phases of operation. Using phase multiplexing and a distinct service phase, a phase multiplexed communication system is able to service itself dynamically using the same communication facilities provided for run phase, the message transfer phase that supports parallel processing. Thus, by eliminating the need for a completely separate "service" network, phase multiplexing achieves simplification by avoiding additional wiring and the concomitant need for additional connectivity at each switch element, additional complexity that would inevitably increase the cost of the system.

Phase multiplexing is not, however, without a price, and that price is the additional logic needed throughout the network to synchronize phase transitions. It is therefore necessary that this logic be kept to a minimum in order to achieve a favorable trade-off in the use of phase multiplexing rather than a separate service network. A phase multiplexed communication network is described in U.S. patent application Ser. No. 992,200 filed Dec. 17, 1992 by Monty M. Denneau et al entitled "Synchronous Communication System Having Multiplexed Information Transfer and Transition Phases." As described therein, the logical complexity of accommodating the so-called phase-transition problem can be solved by introducing globally executed transition phases, special phases of fixed duration (Q clock cycles) which are effective provided that a parameter called exposure (e) is within the bounded range $$0 \leq e_i \leq Q \qquad [1]$$

for each and every transmission segment (i=0, 1, 2, ...) of the network. (A transmission segment is a specifically defined portion of each transmission path between any pair of communicating devices, each such device also being called a channel.)

The above patent application also shows how the pair of equations (1) that govern full-duplex information transfer between two channels over any two oppositely directed segments (collectively called a transmission stage) can be reduced to the single constraint $$G(0, K-Q) \leq e \leq L(K, Q) \qquad [2]$$

where e is the exposure at either segment of the stage, K (called stage latency) is a measurable constant associated with the round-trip signal delay through the stage, and G and L denote, respectively, the greater and lesser of the quantities in the associated parenthesis. Thus, in order to achieve full-duplex, transitioned phase-multiplexing on a global basis, Equation (2) must be satisfied by all transmission stages of the network, and this makes exposure a critical parameter relative to the initialization of a phase multiplexed communication system.

For phase multiplexed channels, moreover, it happens that precise values of exposure are also needed for the purpose of setting the counters used for frame synchronization, the so-called slot-out and slot-in counters. This additional dependence upon exposure, combined with that of transitioned phase multiplexing, as expressed by Equation (2), makes exposure determination an inseparable part of phase multiplexed architecture, and additional logic is needed for this purpose. Given the need to keep logical complexity to a minimum, it was therefore necessary to seek innovative ways and means for determining exposure throughout a phase multiplexed network.

The present invention is also applicable to communication networks in general, particularly whenever time or event synchronization is needed. This broad and important general applicability is a consequence of the fact that exposure is synonymous with transmission delay and, in particular, with what is defined herein as virtual transmission delay (vtd).

Basic Concepts and Definitions

An understanding of the precise meaning of the terms exposure, transmission segment, transmission stage, stage latency, node, network, etc ... is essential to an understanding of this invention.

The Network and Its Elements

This invention is about networks. The term network as used herein refers to the set of interconnected nodes shown in FIG. 1. A node is an arbitrary data source/sink device and its associated transmit/receive logic. The nodes of a network need not be identical in function, although in practice many of them are, e.g., the switch elements. One particular node, called the Central Service Node (CSN), is given the special responsibility of providing the network with initialization, performance monitoring, diagnostic, and fault-recovery services. All other nodes of the network are referred to as remote nodes (relative to the CSN).

The basic interconnect element is the transmission segment (see FIG. 2). A transmission segment comprises (a) a transmit register (TR) and associated transmit logic, located within a node, (b) a receive register (RR) and associated receive logic, located (generally) in a different node, and (c) an interconnecting link of any form (wire, wires, fiber-optic cable, radio waves, etc . . . ). The two registers of a segment are clocked by signals that have precisely the same frequency but not necessarily zero phase displacement relative to one another. In short, a transmission segment is the means by which node-to-node synchronous information transfer is performed. The symbols shown at the right in FIG. 2 denote abbreviated ways of representing a transmission segment.

Each node of the network of FIG. 1 terminates at least one segment that completes a transmission path from the CSN, but the interconnect topology is otherwise arbitrary: any node can be connected to any number of other nodes and any pair of nodes can be interconnected by one or more segments, or they may not be interconnected at all. Two oppositely directed segments (and related logic) associated with the same two nodes are referred to collectively as a transmission stage. Segments A and B in FIG. 1 are elements of a transmission stage.

Another basic element of the invention is the nodal time counter (NTC). A NTC, located in each node and clocked by the same clock signal CLK that clocks transmit and receive registers, is the synchronization counter for the node. A NTC is shown in FIG. 2. All phase transitions at the node are determined by the integer content of this counter. This content is called nodal time. The distinction between the NTC and the CLK is evident in FIG. 2. Note that each transmission segment is associated with two NTCs, one at each end of the segment.

The parameters that govern information transfer across a transmission segment are set forth and defined in the transmit/receive diagram of FIG. 3. This diagram is central to all that follows. Accordingly, a detailed description of this diagram is provided below.

The Transmit (Receive Diagram

This diagram provides means to track infels concurrently in two separate time domains as they move along a segment from the transmit register to the receive register. The term infel is used to denote any form of information element, i.e., a bit, byte, word, etc. . . . , that is transmitted (all bits in parallel) during a particular clock cycle. The time domains are those of nodal time at each of the two communicating nodes.

The diagram consists of two chronograms, a transmit chronogram and a receive chronogram. The transmit chronogram (the upper diagram in FIG. 3) refers to the transmit n register. Here, nodal time is arbitrary, and a reference time denoted by the letter a may be assigned to any cycle. Succeeding nodal times then follow as indicated. The content of the transmit register corresponding to the reference cycle is called the reference infel. This infel can be tagged with any ID, and the integer 100 is used in FIG. 3. The infels that follow are correspondingly numbered, and, in FIG. 3, the monotonic numbering corresponds to the assumption that there are no phase transitions. As each of these infels leave the transmit register, they begin their irreversible journey to the receive register.

The lower chronogram of the transmit/receive diagram tracks the progress of the propagating infels as they appear some time later at the input pins of the receive register. This is the receive chronogram, and it is displaced from the transmit chronogram by precisely the phase displacement (pT) of the receive clock relative to the transmit clock. In FIG. 3, the receive clock is arbitrarily shown as lagging the transmit clock. The particular receive cycle that is displaced from the reference cycle by the fractional phase displacement $$-\tfrac{1}{2} < p \leq \tfrac{1}{2} \tag{3}$$

is called the co-reference cycle. Nodal time corresponding to this cycle is called co-reference time and is denoted by the letter b.

The difference between reference time a and co-reference time b is called offset and denoted by the letter x. Thus, $$x = a - b. \tag{4}$$

This parameter may be seen to be synonymous with what is called asynchrony in the literature, and the two terms are used interchangeably in this disclosure. At this juncture in the description of the transmit/receive diagram, offset is completely arbitrary: it can have any algebraic value, that value depending upon how the two counters are initialized. In FIG. 3, a positive offset is illustrated, and the receive cycle for which nodal time is equal to reference time is placed arbitrarily as shown. This cycle is called the matching cycle, and the corresponding nodal time is called match time. Also in FIG. 3, co-reference time is expressed in terms of offset and reference time, namely as (a−x), and all other clock cycles in the receive chronogram are correspondingly numbered.

The clock cycle that latches the reference infel (#100) in the receive register is called the capture cycle, and the corresponding nodal time, called capture time, is denoted as b'. Because signals propagate at a finite speed, the capture cycle must always lag the co-reference cycle. This lag, which is an integral number of cycles, is called segment latency and symbolized by the letter k (lower case). Give this definition and the nodal times thus far established, it follows that capture time has the value $$b' = a - x + k \tag{5}$$

and this value is indicated in the receive chronogram.

It may now be apparent that segment latency, as defined here, is equivalent to what is commonly called "transmission delay," a physical property of the transmission segment. In this disclosure, the term "transmission delay" is further qualified with the prefix "real" when referring to segment latency, for reasons that are made clear in what follows. Thus, the terms segment latency and real transmission delay (rtd) are synonymous, and they are used interchangeably in this disclosure. Rtd, moreover, is assumed to be unknown for all segments of the networks to which this invention may be applied.

In summary, offset and rtd are characteristic features of a transmit/receive diagram. The diagram cannot be constructed without them. Their definitions, moreover, hold for all values of clock phase displacement between the sending and receiving ends of a transmission segment, this displacement being accommodated once and for all during initialization of the network, using procedures that establish the necessary setup and hold times for all signals.

Virtual Transmission Delay (Exposure)

Given the transmit/receive diagram, it is now possible to define the parameter whose global determination is the subject of this invention. This parameter, called exposure, is defined as the algebraic difference between capture time and reference time, namely $$e \equiv b' - a \quad [6]$$

Exposure is therefore the segment transmit time that would be observed by a time traveler (traveling from transmit register to receive register) whose only notion of time is derived from nodal time at the beginning and end of the journey. For this reason, exposure is also referred to herein as virtual transmission delay (vtd).

Noting that reference time and match time are identical, exposure is readily indicated in the receive chronogram of FIG. 3. Once indicated, the diagram immediately reveals the relationship between vtd, rtd, and offset, namely $$e = k - x \quad [7]$$

Equation (7) will hereinafter be called the Delay Conversion Theorem. Thus, depending upon the relative values of k and x segment exposure can, in the absence of any constraints to the contrary, be positive, negative, or zero.

The significance of exposure (vtd) is that it is the sole parameter by which the receiving node may identify arriving data relative to nodal time. Counter-synchronized information transfer between two nodes, i.e., information transfer across a segment, is therefore possible only if the receiving node (a) "knows" the exposure at which the information is arriving, or (b) is of a transitioned phase-multiplexing design such as described in Denneau et al, above, with the information arriving at an exposure within the design range. The role of exposure in the initialization of the counters used for frame synchronization and its appearance in Equations (1) and (2) are a consequence of these facts. Exposure must, therefore, be correctly established at the receiving end of any transmission segment if that segment is to achieve and sustain synchronous operation.

Basal Exposure Distributions

A basal exposure distribution for the network of FIG. 1 is the global set of exposures corresponding to any global set of nodal times. (A "global set of exposures" is inclusive of all segments of the network.) Once a basal distribution is known by the CSN, the CSN can examine the constituent values of exposure and use or modify each of them accordingly. Modification is always possible because of the linear relationship between exposure and offset, expressed by Equation (7). Thus, given a base value of exposure and the fact that k is a constant for each segment, the unknown offset (x), can always be adjusted to achieve a particular value of exposure, to satisfy Equation (2), for example. Such adjustment is made by incrementing/decrementing nodal time at one end or at both ends of the segment. All other segments that originate or terminate at the adjusted node/s are therefore also affected by the adjustment process, making the process potentially tedious. The present invention, however, is concerned only with the matter of establishing and observing basal exposure distributions, i.e., with the matter of gathering raw exposure data. It is not concerned with any adjustment process.

The Single-Segment Network and Exposure Determination Therein

A single-segment network comprises a CSN and a remote node interconnected by a single transmission segment directed at the remote node. Given Equation (6), the definition of exposure, it may be seen that exposure within this elementary network can be established by the CSN, the sending node, in either of two ways: The CSN can, using a "synchronization message" transmitted at a particular reference time a:

1. transmit a value of nodal time b' to the receiving node which the receiving node uses to initialize its NTC, the values of a and b' being chosen by the sending node to achieve a particular value of e consistent with a known execution delay at the receiving node. (Execution delay is the difference between the nodal time at which the counter is set and the capture time of the synchronization message, a constant for any particular implementation of the receiving node);
2. transmit the values of e and a to the receiving node, which the receiving node uses to calculate b' and then initialize its NTC, again consistent with the concomitant execution delay. (In this instance, the value of e need not be supplied by the synchronization message: it can, if desired, be preestablished at the receiving node.)

Thus, using either method, the net result is the same: the NTC at the remote node is initialized to achieve a particular exposure (vtd) for transmissions across the interconnecting segment. Either of the above steps is referred to herein as forcing exposure, and it is the only alternative open to the CSN in the absence (logically and physically) of a return segment. Any one of several forms of synchronization message may be used to force exposure, all requiring various degrees of associated logic at both sender and receiver. In general, because the CSN is always the initiator, its logical complexity will be greater than that of the remote node, although less so for the second method, which requires additional logic, an adder, at the receiving node in order to get the job done.

While forcing exposure is all right for the single-segment network, it is not generally acceptable in the context of a larger network where it is necessary to observe or measure existing values of exposure. This matter is discussed further in what follows.

The Transmission Stage, Stage Latency, and the Stage Theorem

As introduced earlier, a transmission stage is formed whenever two oppositely directed segments between the same two nodes are combined. The combination of send/receive logic at each end of the stage is called a port. The term transmission stage embraces the port at each end and the interconnect. If the two segments are physically distinct, the stage is capable of full-duplex transmission. On the other hand, if the two segments are only logically distinct, the stage is merely bidirectional.

Stage latency is defined as the sum of the real transmission delays corresponding to the two directions of transmission within a stage. Thus, letter k and k' denote these two delays, stage latency is given by $$K = k + k' \quad [8]$$

Stage latency is therefore a physical property of the stage and an invariant for any particular stage. It has nothing to do with nodal time at either end of the stage.

It may be noted that the offsets for the two (logical or physical) segments of a transmission stage are precisely equal but opposite in sign. Thus, applying Equation (7) to each of these segments and adding the two equations, there is obtained $$e + e' = k + k' \quad [9]$$

where the prime is used to distinguish the two segments from one another. This equation is hereinafter called the Stage Theorem. This theorem states that the sum of the virtual transmission delays for the two oppositely directed segments of any transmission stage is equal to the sum of the corresponding real transmission delays, the latter sum being stage latency, by virtue of Equation (8). Thus, because stage latency is a constant for any particular stage, so is the sum of the virtual transmission delays for that stage.

The Single-Stage Network and Exposure Determination Therein

Given the single-segment network, the next step in network complexity is the single-stage network, namely a CSN and a remote node interconnected by a transmission stage. This simple network is of interest because it exhibits the essential problems associated with exposure determination in more complex networks. An examination of this network will therefore provide a basis for understanding the significance of the present invention.

Accordingly, consider the network shown in FIG. 4. How can the CSN determine the exposure for each of the two segments, i.e., e and e'? One of these exposures, namely e (representing the segment directed at the remote node), can always be forced, using either of the methods described for the single-segment network. The exposure for the return segment, namely e', can then be determined by introducing enough "intelligence" at the remote node so that it can work cooperatively with the CSN to make e' calculable by the latter. Specifically, that intelligence would be in the form of means for the remote node to initiate a synchronization message, in response to a request from the CSN (which the CSN would issue after having forced the outbound exposure). That message would transmit a reference time to the CSN which the CSN, by observing the capture time for the message, would use to calculate e', by applying Equation (6).

Unfortunately, the above-described approach, while satisfactory in its limited context, has two drawbacks that make it unsuitable for application to the broader network context. The first drawback is one of logical complexity at the remote node, a complexity associated with the "intelligence" it was given so that it could participate in the exposure determination process. This complexity is in conflict with the objective of achieving a "simple-as-possible" integrated-circuit switching element. The second drawback is that the method requires the CSN to force exposure at the outbound segment, i.e., change nodal time at the remote node. While this requirement is perfectly acceptable for the single-stage network, it is nevertheless unacceptable if the method is to be generalized for application to stages within networks of arbitrary topology, for the following reason: such networks may, and in most cases of practical interest will, contain transmission segments for which exposure cannot be forced without destroying at least some of the exposure values established in preceding steps, i.e., the present method is potentially self-destructive.

To illustrate, consider the simple network of FIG. 5 in which a CSN and two remote nodes, RN1 and RN2, are interconnected by segments 1-6, as shown. Imagine that the remote nodes have enough intelligence to work cooperatively with the CSN so that the latter has determined exposures $e_3$, $e_4$, and $e_5$? Any approach that requires forcing the exposure at any one of these segments is clearly destructive, as it would undo one or more exposure values thus far established, depending upon which segment is forced. Forcing $e_3$, for example, would affect $e_6$. Forcing $e_4$ or $e_5$ would affect both $e_1$ and $3_2$. Neither of these alternatives is therefore acceptable, as it would unleash an interminable process.

In general, any method for determining basal exposure distributions in networks of the type under consideration is defined as destructive if the method requires that exposure be forced at more than $(N-1)$ segments of the network (where N represents the number of nodes). Any such method is therefore unacceptable, it simply won't work, as was illustrated with the network of FIG. 5.

One way to resolve this difficulty is by providing each remote node with enough intelligence so that it can, in response to a synchronization message from the CSN, observe the capture time of the synchronization message and, using a return segment, transmit that value to the CSN. The CSN can then use that information to calculate the exposure of the outbound segment, using Equation (6). With this expedient, the method becomes unconditionally non-destructive: preexisting nodal times need not be disturbed. But this expedient adds more logical complexity at the remote nodes, namely that associated with the additional intelligence needed for this further participation in the exposure determination process.

There is, therefore a need for further innovation in order for a CSN to determine exposures non-destructively in networks having "simple-as-possible" elements, and it is to this need that the present invention is directed.

Active vs. Passive Nodes

Nodes having the "intelligence" needed for participating actively in the exposure determination process, in ways like those described in the discussion of the single-stage network, are herein called active nodes. Specifically, an active node is one having the functional capability for generating synchronization messages. Nodes that do not have this functional capability are called passive. This terminology will be seen to be helpful when examining the prior art.

Discussion of the Prior Art

Given the basic concepts and definitions of the previous sections (which are not prior art) it is now possible to examine the prior art of exposure determination with a focus upon the question of whether or not that art can be acceptably applied to the problem at hand, namely the determination of basal exposure distributions in networks for which real transmission delay and offset are unknown for all segments. The term "acceptable" refers to, among other things, the concomitant requirement for logical simplicity: the nodes, at least the majority of them (the "switching nodes"), must not be unduly encumbered by exposure determination logic. Prior art specifically directed to this requirement is not known to the inventors. There is, however, patent literature devoted to matters of synchronizing clocks and/or events in a dispersed system, and it is important to understand how this art relates to the present invention.

An example of such art is found in the patent of Vangen (U.S. Pat. No. 4,337,463). This patent describes a scheme for synchronizing the clock of a "remote station" with that of a "master station", the term station referring to power generation/consumption stations as found in the utility industry. The object of the Vangen system, in the terminology of the present invention, is to achieve zero offset between master and remote clocks (nodal time counters). Establishing particular values of exposure (vtd) for transmissions between these two stations is therefore only a means to this end, not the end in itself. The Vangen system achieves its objective by first having the master station set the clock at the remote station to a known value, thereby creating a correspondingly known value of exposure, in accordance with Equation (6). A value of $e=0$ is used by the Vangen scheme, although any other value could have been used and implemented. This step is, in effect, the first of the methods previously described for the single-segment network. The second step of the Vangen scheme reverses the process: the remote station, using a reciprocal synchronization message, sends the master station a reference time which the master station captures and uses to calculate the exposure of the return segment, $e'$. The remainder of the scheme, which is irrelevant to the present subject but nevertheless described for completeness, involves calculation of what is referred to herein as stage latency, using the Stage Theorem. The result, therefore is $K=e'$, and the Vangen scheme goes on to calculate and transmit a new value for the remote clock setting, a value corresponding to an exposure of $e=K/2$. The remote clock is thereby synchronized to zero offset, if it is assumed that the real transmission delay (rtd) along the outbound path is precisely equal to that for the inbound path, i.e., if it is assumed that $k=k'=K/2$.

The Vangen scheme may be seen to be decisively destructive: the first step is always one of forcing exposure at the remote node. Thus, after having forced the exposure at $(N-1)$ segments, there is no non-destructive way to proceed to other nodes. This alone makes the Vangen scheme unacceptable for present purposes. But even were this not the case, the Vangen remote nodes, being of the active type, are unacceptably complicated.

Another method of exposure determination is found in the patent of Rodman and Boland (U.S. Pat. No. 4,411,007). This patent is specifically directed at a tree-type digital transmission system comprising a central station and a plurality of remote stations, a topology closer to the networks of interest than that of the Vangen patent. The Rodman/Boland topology is, in fact, a special case of the network shown in FIG. 1. The objective of the Rodman/Boland patent is to provide a "system" for synchronizing information transfer in both directions between the central station and each concurrently operating remote station. The essence of that system is essentially what has already been described herein in the description of exposure determination for the single-stage network: the central station effectively sets the synchronization counter at each remote station to a known exposure (in this case, to $e=0$), using "standard and well known DS-1" frame synchronization techniques. The central station then determines $e'$ for the return path from each remote station, using either of two methods, one involving active participation of the remote station (participation like that described herein for the single-stage network), the other method involving a calculation of $e'$, using a measured value of stage latency (based on "loop" measurements) and the known value of exposure for the outbound path. The system then goes on to transmit the observed value of $e'$ to the corresponding remote station, which the latter uses to "advance" its time of transmission relative to the particular time "slot" to which is has been assigned. Information transmitted by the remote station will then arrive at the central station at precisely the assigned time slot. Outbound transmissions, from the central station to each remote station are achieved with zero advance, corresponding to the zero exposure at each outbound segment.

The Rodman/Boland system thus provides means to reduce potential complexity at the remote stations, that means being passive reflection to "loop the signal back to the central station," referring to the step of measuring stage latency. However, the Rodman/Boland system, like that of Vangen, remains dependent upon first setting the synchronization counter at each remote station to achieve a particular exposure, and that is its Achilles heel with regard to its applicability to networks wherein such a requirement becomes destructive. Thus, while the Rodman/Boland system is suitable for the tree-type networks to which it is directed, it is not at all suitable for application to more general topologies which include, effectively, remote station-to-remote station interconnections. Rodman/Boland provides no indication whatsoever as to how information transfer across these "closures" might be synchronized.

A third patent of interest is that of Larson (U.S. Pat. No. 4,569,042). This patent relates to "a method and structure for measuring signal transmission delays" in communication systems.

The Larson patent describes a measurement technique by which round-trip transmission delay and exposures are measured in the context of two essentially identical "interfaces" coupled by a transmission path. These measurements are then used to compute the approximate values of rtd (k) for each of the two directions of transmission and the asynchrony (X) between the two clocks of what is, in effect, a symmetrical transmission stage. Of present interest is only the underlying measurement technique.

The technique is one of sending a "first message" from one interface to the other, which the latter, in response, modifies and retransmits back to the originating interface as a "second message." The first message carries a time stamp indicating its time of transmission, and the second message returns that time stamp to the originator along with a second time stamp indicating the time of transmission of the second message. Using this information and the time at which the second message is received, the first interface calculates two distinct transmission parameters: (1) a round-trip transmission delay, R, and (2) exposure (vtd) for the return segment, i.e., $e'$. The procedure is then effectively reversed, thereby allowing the second interface to make its own determination of R and exposure, the latter being that of the original outbound segment, i.e., e (unprimed). Each interface then applies its own measurements, as indicated above.

The Larson method therefore involves a composite of active nodes, two of them, upon which is imposed, redundantly, a scheme for measuring R, which Larson uses to approximate the value of stage latency K. Thus, while entirely non-destructive of exposure in its measurements, the amount of logic is unacceptably excessive. Given active means at both nodes for precise calculation of exposure of the incoming segment, the two nodes could simply exchange these values with one another, thereby enabling each of them to calculate K precisely, using the Stage Theorem. This would completely obviate the additional logic which Larson must provide in order to measure R. And, by eliminating this measurement, the error of approximation, associated with neglecting intra-nodal delay (when using the measured value of R to approximate stage latency, K), would also be eliminated.

The Larson method of measuring R is also unnecessarily cumbersome for present needs. Larson specifies that the synchronization messages must circulate the time of transmission (reference time) from a "first interface" to a "second interface" and then back to the first interface. Though not described by Larson, R could, instead, have been determined by the first interface merely by "circulating" any signal, e.g., a pulse, over the same loop while correspondingly starting and stopping an elapsed-time counter at the first interface.

It may be concluded, therefore, that the active logic of the Larson system, if applied to the remote nodes of the network of FIG. 1, would be unacceptably excessive. It would, in words found in the Larson patent application itself, "increase the complexity and cost of the nodes, and hence of the network."

If it is assumed that these three patents are exemplary of the prior art, it appears that there is a lack of understanding of the basic principles embodied in the Stage Theorem and in the concept of virtual transmission delay. It further appears, therefore, that there is yet a distinct need for an improved centralized method of determining exposure distribution within digital data communication networks. And it is to this need that the present invention is directed.

Objectives of the Invention

Accordingly, it is the first objective of this invention to provide a single node of a digital data communication network, called the central service node (CSN), with a method and apparatus for: (a) establishing any value of virtual transmission delay (vtd) at individual transmission segments; (b) nondestructively determining the existing vtd at individual transmission segments; and (c) establishing basal distributions of vtd and determining the elements thereof.

It is another objective of the invention that the apparatus and non-destructive method be so devised that logical complexity be kept to a minimum throughout the network, the ultimate objective being that all nodes of the network, exclusive of the CSN, be passive participants in the exposure determination process.

And it is yet another objective of the invention that both of the preceding objectives be achievable within networks for which inter-nodal latency (rtd) and inter-nodal asynchrony (offset) are globally unknown to the CSN.

Summary of the Invention

In order to achieve the objectives set forth in the previous section, the inventors have provided the CSN with means to (a) create strings and loops, using conditioning messages that selectively establish a pass-through segment at any remote node, (b) set the NTC at the terminating node of any string to achieve a particular exposure at the terminating segment of that string, using a synchronization message, (c) traverse any loop with a signal and measure the round-trip delay associated with that signal, and (d) calculate the exposure for any transmission segment of a loop, given the round-trip delay measured for that loop, the pass-through delays, and the exposures at which the other segments of the loop are operating. The invention further discloses the method by which the CSN can exercise these means to establish and determine basal exposure distributions for the associated digital data communication network.

Definition of Terms

A pass-through segment is the logical entity illustrated in FIG. 6. Unlike the transmission segment, this segment exists solely within a node. A pass-through segment comprises (a) a receive register (RR), a transmit register (TR), and nonspecific pass-through logic connecting the output of the RR with the input of the TR. These two registers are the same registers that are associated with transmission segments (see FIG. 2). The pass-through segment provides means for information to be passed from the receiving end of a transmission segment to the sending end of another transmission segment. Inasmuch as the registers of a pass-through segment exist within the same node, they share the same clock signal (CLK). The integer transmission delay, measured from the input of the RR to the input of the TR is called pass-through delay and represented herein by the Greek letter $\lambda$. The symbols shown at the right in FIG. 6 denote abbreviated ways of representing a pass-through segment and may be seen to be a reversed version of those used for the transmission segment.

A string (see FIG. 7) is an unbroken, alternating sequence of transmission segments and pass-through segments, beginning with a transmission segment originating at the CSN, continuing with any number (including zero) of the other segments sequenced so that a pass-through segment always separates transmission segments, and ending with a transmission segment. The ending segment and node of a string are called the terminating segment and terminating node, respectively. For purposes of description, the transmission segments of a string are numbered monotonically, from 1 to n, where n is the last segment of the string. The remote nodes are correspondingly numbered.

A loop is a string for which the CSN is also the terminating node. The simplest form of loop, the "molecular" loop, is shown in FIG. 8. A more general loop, typical of loops that can be formed within the network of FIG. 1, is illustrated in FIG. 9.

Virtual string delay, also called string exposure, is experienced by a signal propagating through an n-node string. This delay is defined as the algebraic difference between capture time at the terminating node and reference time at the CSN, namely $$E_n = b'_n - a_o. \qquad [10]$$

In this equation, the CSN is designated as node O. String exposure is therefore the transit time that would be observed by a time traveler traversing the string whose only notion of time is derived from nodal time at the beginning and at the end of the traverse. Like ordinary exposure, $E_n$ is always establishable by the CSN, by the expedient of setting the NTC of the terminating node to achieve a particular value of $b'_n$.

Given the definition of virtual string delay, it may be demonstrated, either intuitively or analytically, that $$E_n = \sum_{i=1}^{n} e_i + \sum_{i=1}^{n-1} \lambda_i. \qquad [11]$$

This equation, called the String Theorem, states that virtual string delay across an n-node string is equal to the sum of the constituent exposures augmented by the sum of the constituent pass-through delays, the latter sum therefore having one less term than the former. This theorem, which is discussed further in what follows, is the theoretical basis for the present invention.

A synchronization message is used by the CSN to set the NTC at any terminating remote node. Each synchronization message, transmitted along a string, corresponds to a particular reference time of transmission and to a particular value of exposure to be established at the terminating segment. The terminating node, in response to the synchronization message, sets its NTC to a value that achieves the desired exposure, in accordance with Equation (6). Intra-nodal latency at the terminating node, corresponding to the delay in setting the NTC relative to the moment of capture of the synchronization message, may be accommodated either by the terminating node or through information carried by the synchronization message itself. (The synchronization message of the preferred embodiment delivers an "adjusted" time to the terminating node which that nodes uses as the initialization value.) The setting of a NTC in this manner is referred to as forcing exposure, the forced exposure being that of the terminating segment.

A remote node whose NTC has been set by the CSN is said to have been visited. A remote node whose NTC has not yet been set by the CSN is referred to as an unvisited node. A remote node is visited by the CSN only once, but that node may experience pass-through any number of times. Any transmission segment by which a receiving node has been either visited or passed-through is called a traversed segment; otherwise, it is said to be untraversed.

Along with these terms, there is also the notion of a logical entity called the exposure table. This table is maintained by the CSN. Within this table, the CSN records the status of segments (traversed or non-traversed) and the status of nodes (visited or unvisited). The exposure table also lists the exposure corresponding to each traversed segment. The location and implementation of the various elements of this table, e.g., whether centralized or distributed, is independent of the invention.

Method and Apparatus

The methodology of the invention is described in its entirety by the flowchart of FIG. 10. The basic apparatus needed to support this methodology is shown in FIGS. 11 and 12.

A basal exposure distribution is extracted by applying the methodology to as many strings and loops as necessary to cover the entire network. The order in which strings and loops are created and applied will depend on the network topology and upon the preferences of the system designer. Independent of these dependencies, however, repeated application of the methodology within a network of N nodes will always lead to the forcing of exposure at $(N-1)$ transmission segments, and no more, regardless of the total number of transmission segments within the network.

Theoretical Basis

In brief, the essence of the invention is the mixed use of strings and loops: strings to force exposure at $(N-1)$ transmission segments of the network, and loops to observe exposure non-destructively at the remaining transmission segments. All remote nodes are strictly passive participants in the process, each remote node requiring no more than pass-through facilities and means to set its NTC in response to a synchronization message received by way of any incoming transmission segment.

The forcing of exposure is achieved through the successive application of Equations (10) and (11). Equation (11), the String Theorem, generates the successive values of virtual string delay as the string is extended into the network. Using each successive value of $E_n$, chosen to achieve any desired value of terminating exposure, a corresponding value of $b'_n$ is computed from Equation (10). That value, adjusted for message execution delay at the terminating node, is then transmitted by means of a synchronization message to the terminating node, where it is used to set the NTC. The specific value to which $NTC_n$ is set is given by $$b''_n = E_n + \tau_n + a_o \qquad [12]$$

where $E_n$ is the desired virtual string delay across the string, $\tau_n$ is the message execution latency at the terminating node, and $a_o$ is reference time at the CSN corresponding to the transmission of the synchronization message.

The use of loops for non-destructive observation of exposure is based on the fact that virtual string delay for a loop is precisely equal to the real string delay that a signal would experience in traversing that loop. Virtual string delay is therefore a quantity that can be measured by the CSN. Thus, calling this measurable delay round-trip delay and representing it by the symbol R Equation (11) becomes $$R = \sum_{loop} e_i + \sum_{loop} \lambda_i \qquad [13]$$

where the symbol $$\sum_{loop}$$

denotes summation of the associated parameter around the loop. (The second sum thus contains one less term than the first sum.) Equation (13) is called the Loop Theorem.

The significance of Equation (13) is that it provides direct means for the CSN to calculate any single unknown exposure within any loop for which all other exposures, and all pass-through delays, are known. The limitation to only one unknown exposure follows from the fact that any set of equations, consisting of Equation (13) derived from independent loops, is not solvable: the coefficient determinant of this set of equations will always vanish.

Noting that R and $$\sum_{loop} \lambda_i$$

are knowns in Equations (13), it is convenient to express the Loop Theorem in the form $$\sum_{loop} e_i = K \quad [14]$$

where $$K \equiv R - \sum_{loop} \lambda_i \quad [15]$$

The parameter K is called loop latency, and it is used in the preferred embodiment of the invention.

BRIEF DESCRIPTION OF THE DRAWING

FIG. 3 is the definitive timing diagram of the invention, called a transmit/receive diagram.

FIG. 16 is a formal description of the Load Channel Time counter (LCTC) service message used in the preferred embodiment.

DESCRIPTION OF THE PREFERRED EMBODIMENTS

Figure 1:
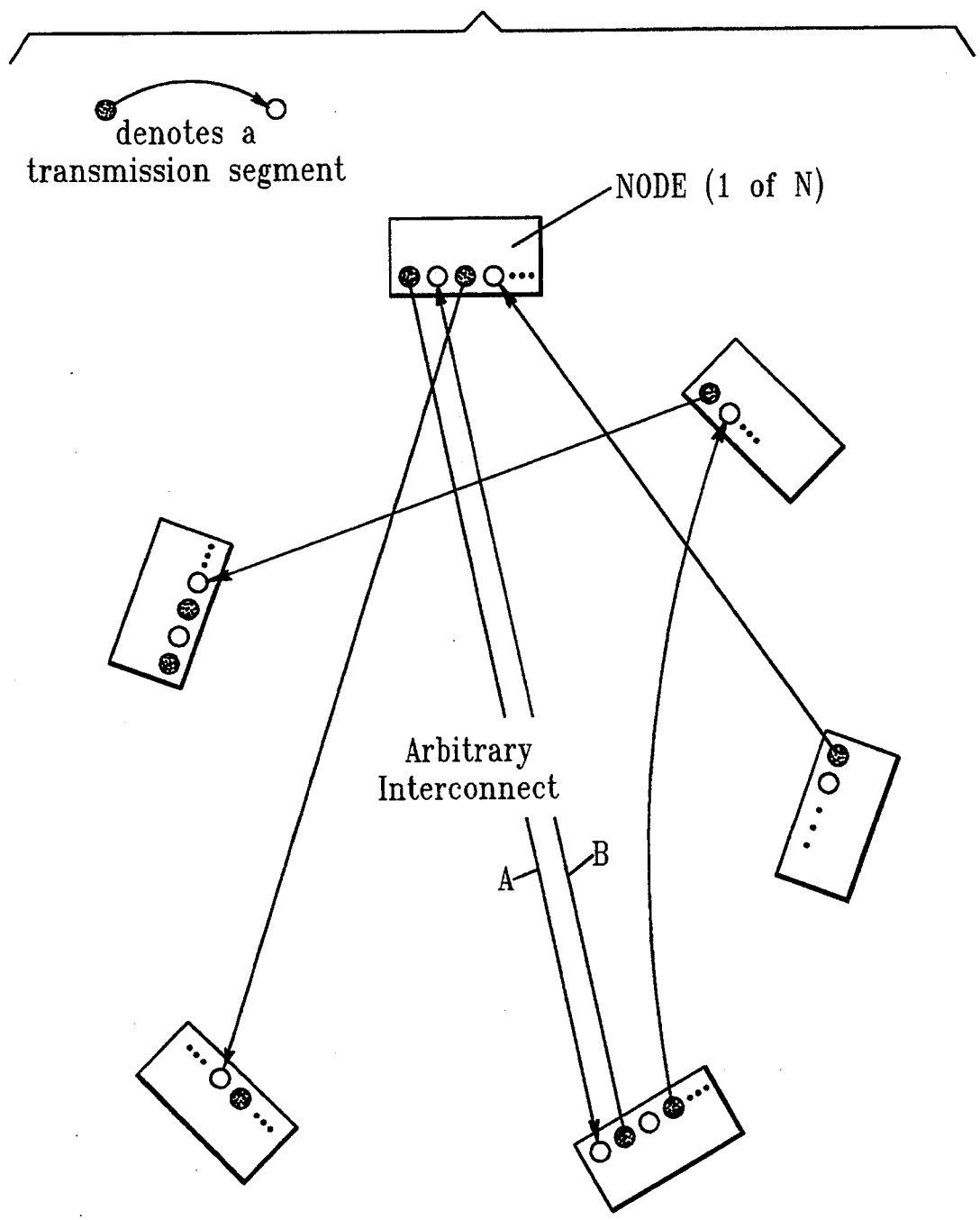
FIG. 1 is a diagram illustrating the generic network of the invention.
Figure 2:
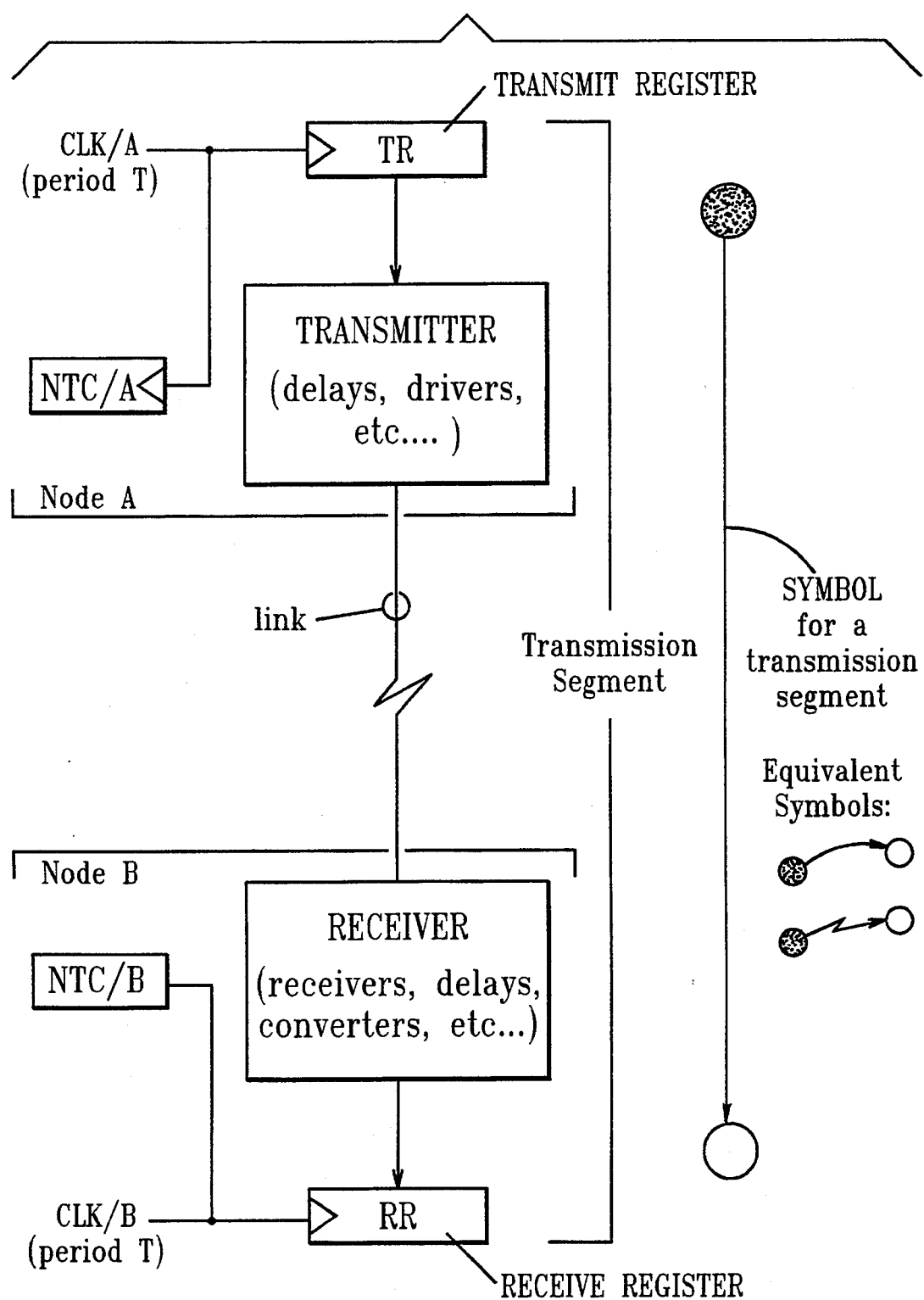
FIG. 2 is a diagram that defines the elements of a transmission segment.
Figure 4:
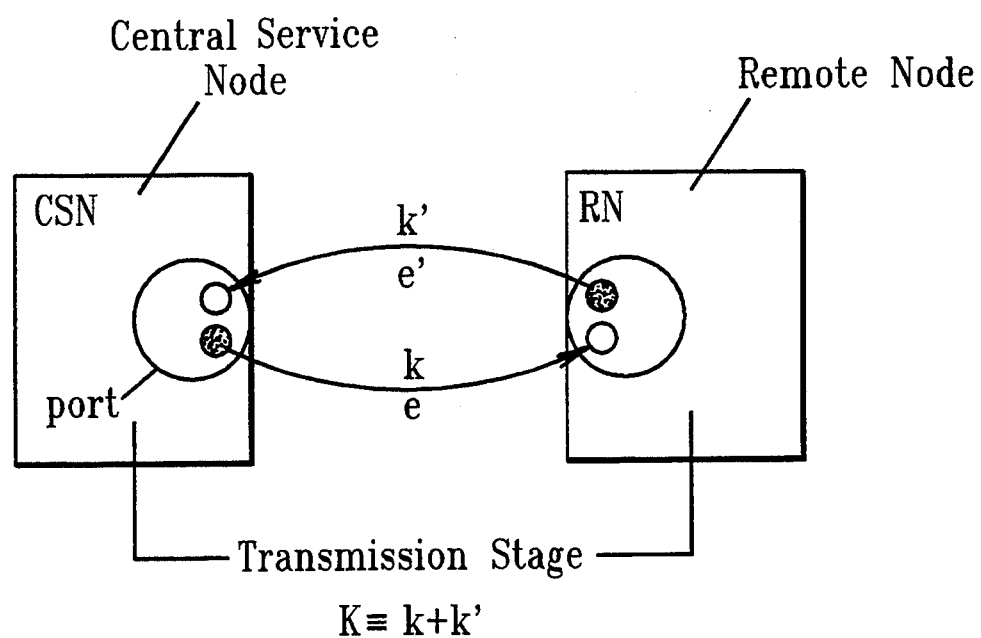
FIG. 4 is a diagram illustrating a single-stage network.
Figure 5:
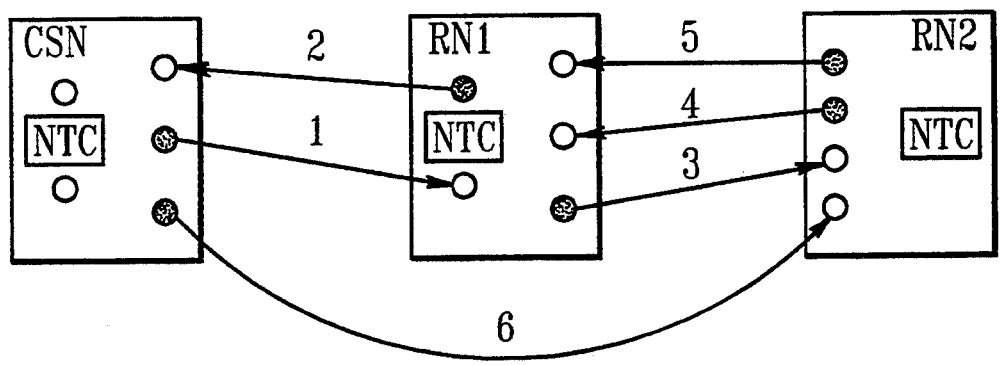
FIG. 5 is a diagram illustrating a network for which exposures cannot be forced at all segments.
Figure 6:
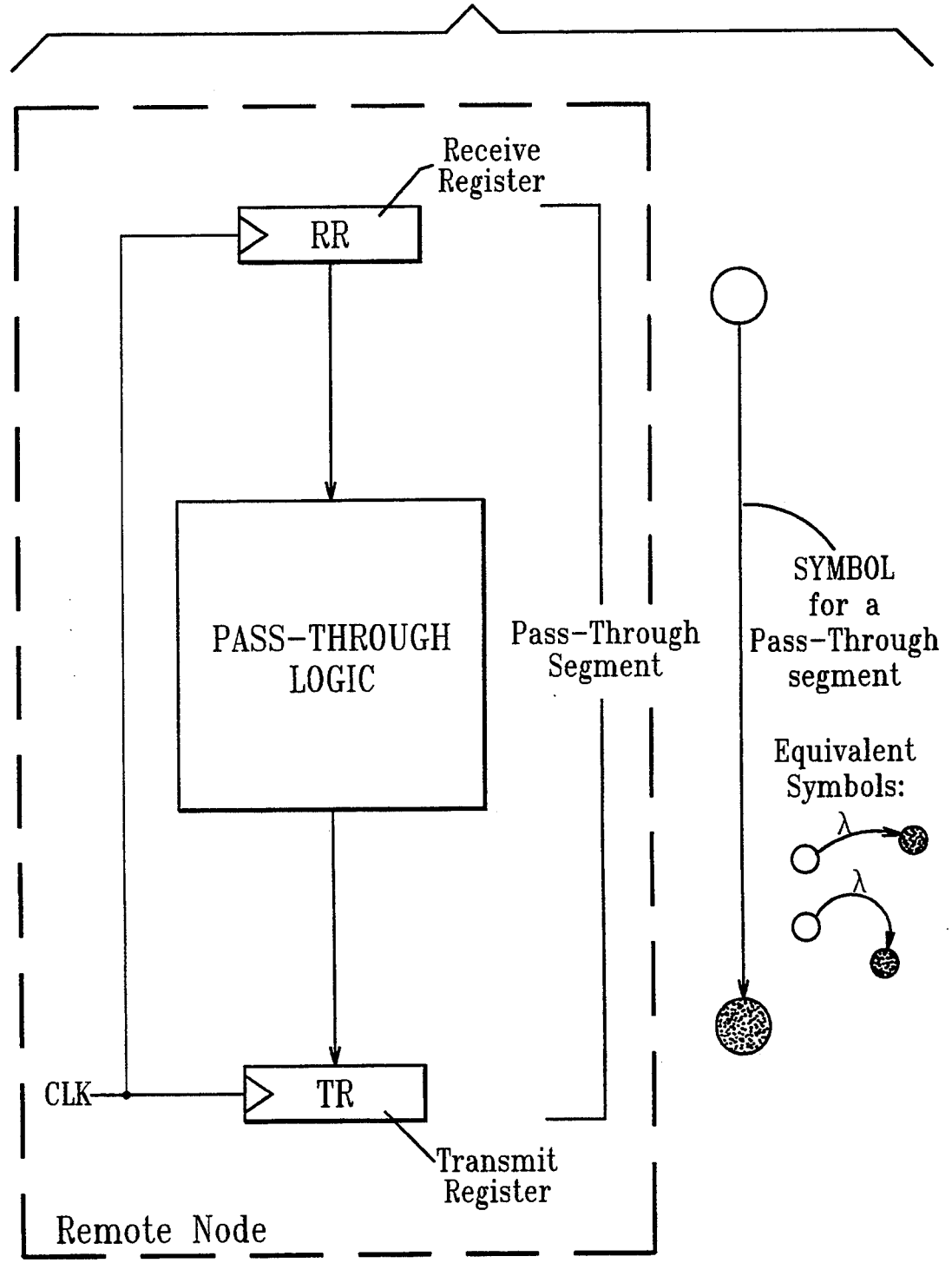
FIG. 6 is a diagram that defines the elements of a pass-through segment.
Figure 7:
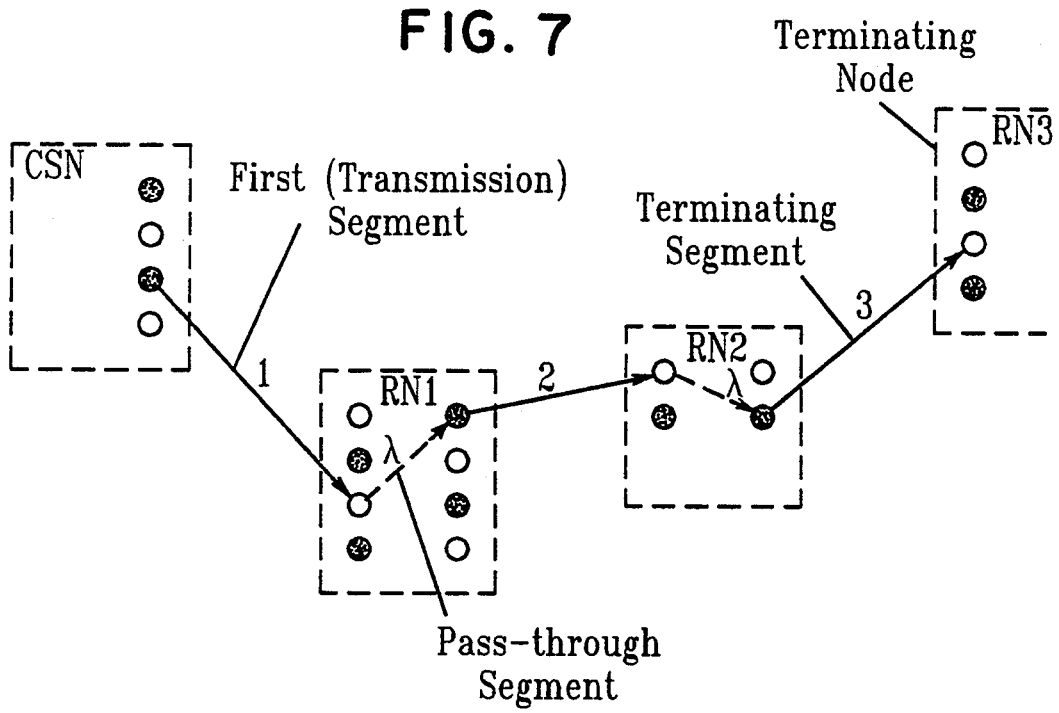
FIG. 7 is a diagram that defines the elements of a string.
Figure 8:
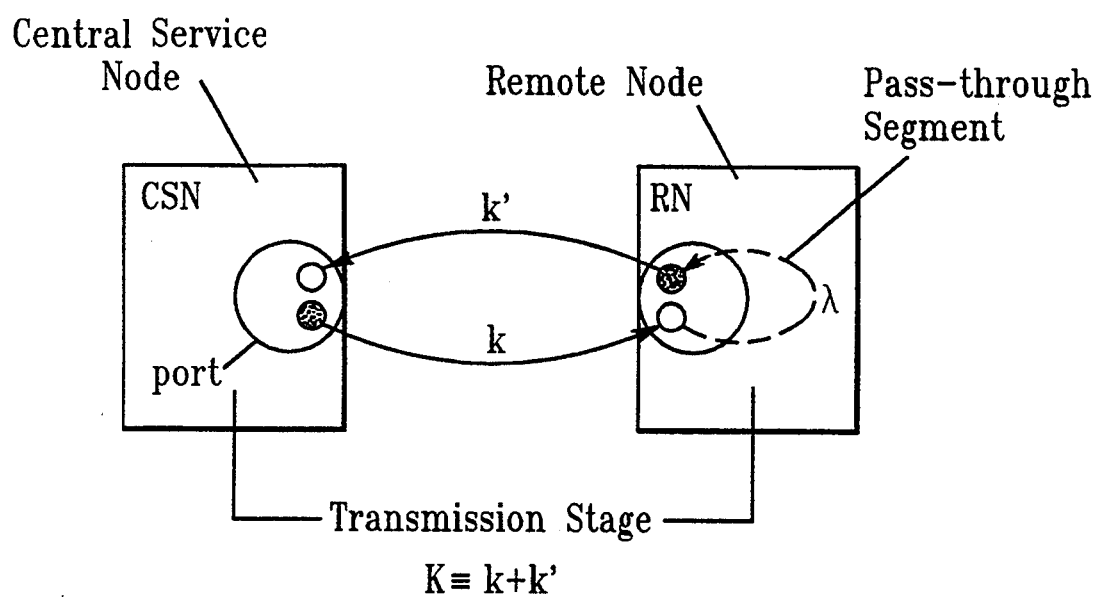
FIG. 8 is a diagram illustrating a loop within a single-stage network.
Figure 9:
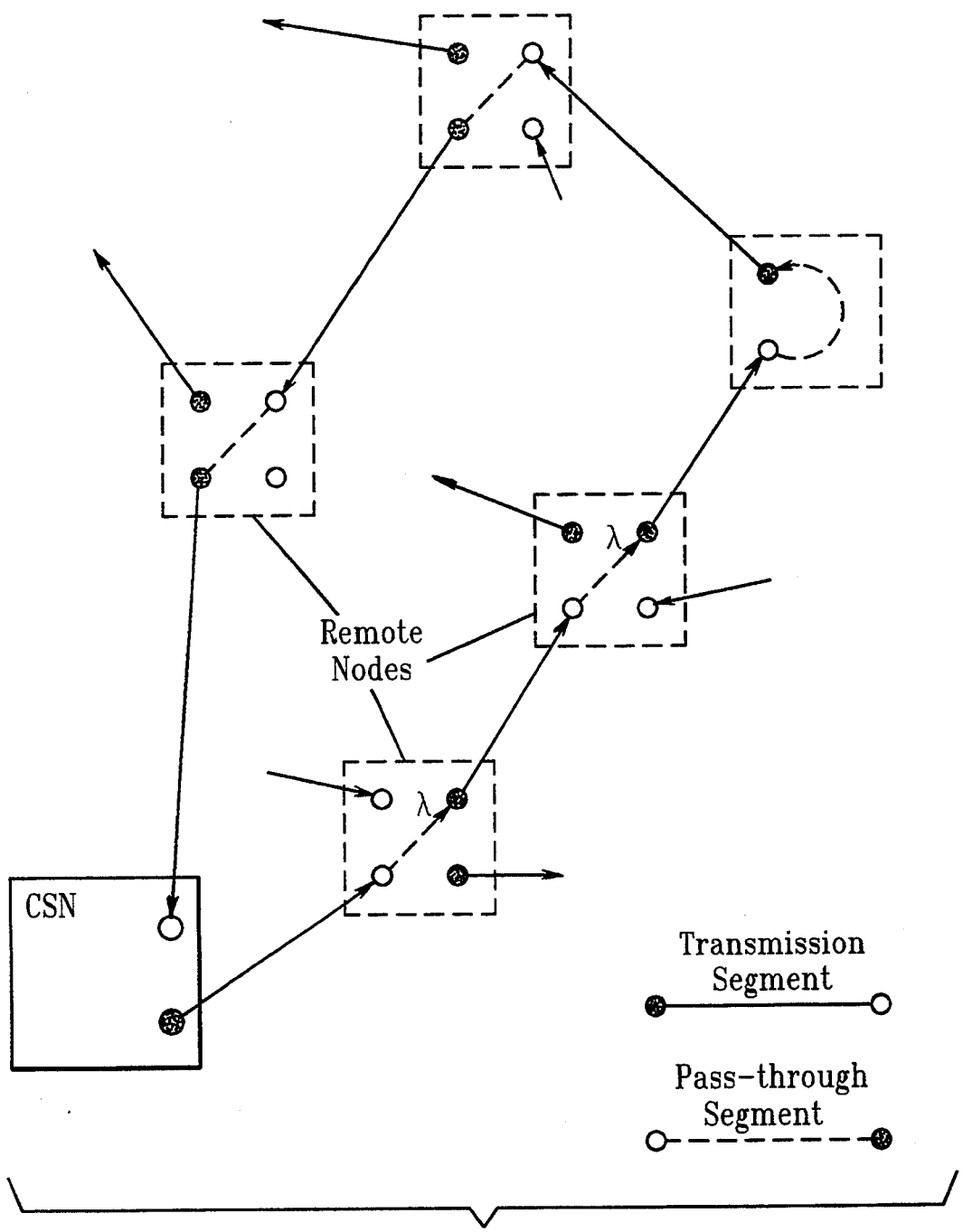
FIG. 9 is a diagram illustrating a typical loop within the network of FIG. 1.
Figure 13:
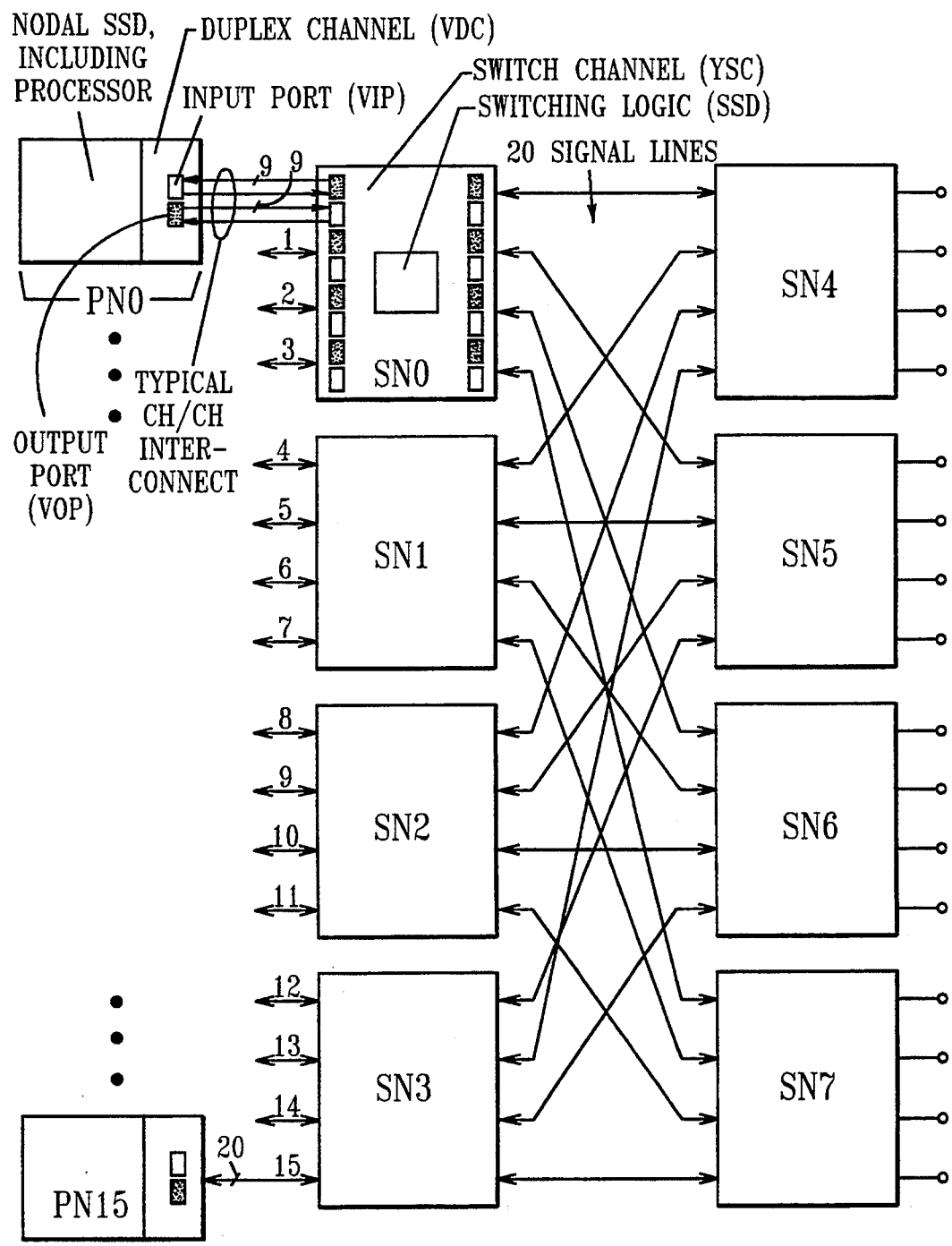
FIG. 13 is a diagram describing the network of the preferred embodiment.

A network of twenty-four-phase-multiplexing nodes is illustrated in FIG. 13. This network comprises sixteen processing nodes interconnected by an eight-element switch card, each switch element itself being a node in the sense of FIG. 1. The processing and switching nodes are numbered PNO-PN15 and SNO-SN7, respectively, as indicated in FIG. 13.

Each switch node has two logical components: (1) a transitioned phase-multiplexer (TPMPX) channel, called the switch channel (VSC), and (2) a source/sink device (SSD), which performs the switching function. Each VSC implements eight output ports (VOPs) and eight input ports (VIPs), paired as eight duplex ports. All VIP/VOP pairs are connectable within the switch.

Each processing node includes a duplex channel (VDC), also a TPMPX channel, but one having a single VIP and a single VOP, i.e., a single duplex port. All channels are interconnected duplex port-to-duplex port and VOP-to-VIP, thereby creating pairs of oppositely directed transmission stages. Each pair of these oppositely directed stages is called a duplex stage. Each processing node thus communicates directly with only one switch node, via a duplex stage.

The interconnect (link) associated with each duplex stage is a twenty-signal cable that provides means to transmit tagged bytes (nine bits in parallel) from VOP to VIP and "token" bits from VIP to VOP, both concurrently in each of two directions. A VOP and VIP are therefore characteristically different from one another, and the transmission stage that they form is consequently asymmetric. It is necessary therefore to distinguish the two segments of each stage from one another in order to avoid confusion, and, to this end, this disclosure uses the lower-case letters b and t to denote the byte and token segments of a transmission stage.

The global interconnect for the network of FIG. 13 is therefore a set of thirty-two, twenty-signal cables of identical structure, but of varying and imprecisely known lengths, that tie together the twenty-four nodes as shown. Given the omega topology of the switching portion of the network, each processing node may engage in full-duplex "message" communication with any other processing node, or it may communicate concurrently with each of two different processing nodes, one receiving, the other sending. The routing of such messages may vary but, in practice, is fixed by pre-established routing tables accessible to the CSN.

Any processing node may be designated a central service node (CSN), and it is the task of the CSN to synchronize the twenty-three nodal time counters, called channel time counters (CTCS), of the other nodes. For purposes of describing the preferred embodiment of the invention, it is assumed that PNO of FIG. 13 is the CSN.

Both the VDC and the VSC have pass-through capability implemented entirely within the channel, i.e., exclusive of the respective SSD. At a VDC, for example, pass-through logic provides means to connect the VIP and VOP internally so that tagged bytes incoming at the VIP can pass directly to the VOP, and tokens incoming at the VOP can pass directly to the VIP. Service messages, originating either at the SSD (in the case of the CSN), or incoming at a VIP at all other nodes, are used to enable or disable VDC pass-through at a channel.

At the VSC, the function is similar, but much more complicated, in at least three respects. First of all, the basic pass-through path is a broadcast fan-out comprising any VIP (called the "control VIP") and any preselected VOP or combination of VOPs. Tagged bytes incoming at the control VIP are routed to all preselected VOPs, and the token streams incoming at each of these VOPs are ORed together and passed to the control VIP. Secondly, the basic pass-through path can be augmented concurrently by a so-called "back-pass-through" path having the same functional characteristics as the basic pass-through path but emanating (normally) from any VIP other than the control VIP. This second VIP is called the "back-source" VIP. Service messages are also used to enable or disable VSC pass-through, but these message never originate within a switch, they are always incoming at the control VIP.

Transmission Chains

Because of the topology of the network and the ubiquity of transmission stages, it is convenient to apply the methodology of the invention to transmission chains and special kinds of loops derived therefrom. A transmission chain is defined as a concatenation of transmission and pass-through stages, beginning at the VOP of the CSN, continuing with any number (including zero) of the other stages sequenced so that a pass-through stage always separates transmission stages, and ending always with a transmission stage, and therefore at a VIP (called the terminating port). A pass-through stage is an intra-nodal entity formed by two oppositely directed pass-through segments associated with a common VIP/VOP pair. A chain is therefore nothing more than two parallel and oppositely directed strings associated with identical ports.

A reflection loop (see FIG. 14) is formed within the terminating node of a chain by interconnecting the byte and token segments of the terminating transmission stage. This particular form of pass-through, called reflection, provides means for parallel data, originating at the VOP of the CSN and propagating through the byte string of the chain, to be converted (by ORing) at the terminating node into single-bit token signals and then returned to the CSN by way of the token string of the same chain. Reflection thus involves only a single port, namely a VIP.

The Loop Theorem, when applied to a reflection loop, can be expressed in a particularly convenient form. Referring to Equation (14), it will be noted that the summation of exposures around the reflection loop always includes both segments of each constituent stage. Thus, by the Stage Theorem (Equation 9), it follows that $$\sum_{loop} e_i = \sum_{loop} K_i$$

Making the indicated substitution into Equation (14), there is obtained $$\sum K_i loop = K. \qquad [16]$$

Equation (16) is called the Reflection Loop Theorem. It states that the sum of the stage latencies within a reflection loop is equal to the loop latency, the latter being the measurable quantity defined by Equation (15). The Reflection Loop Theorem is used extensively in what follows.

Figure 14:
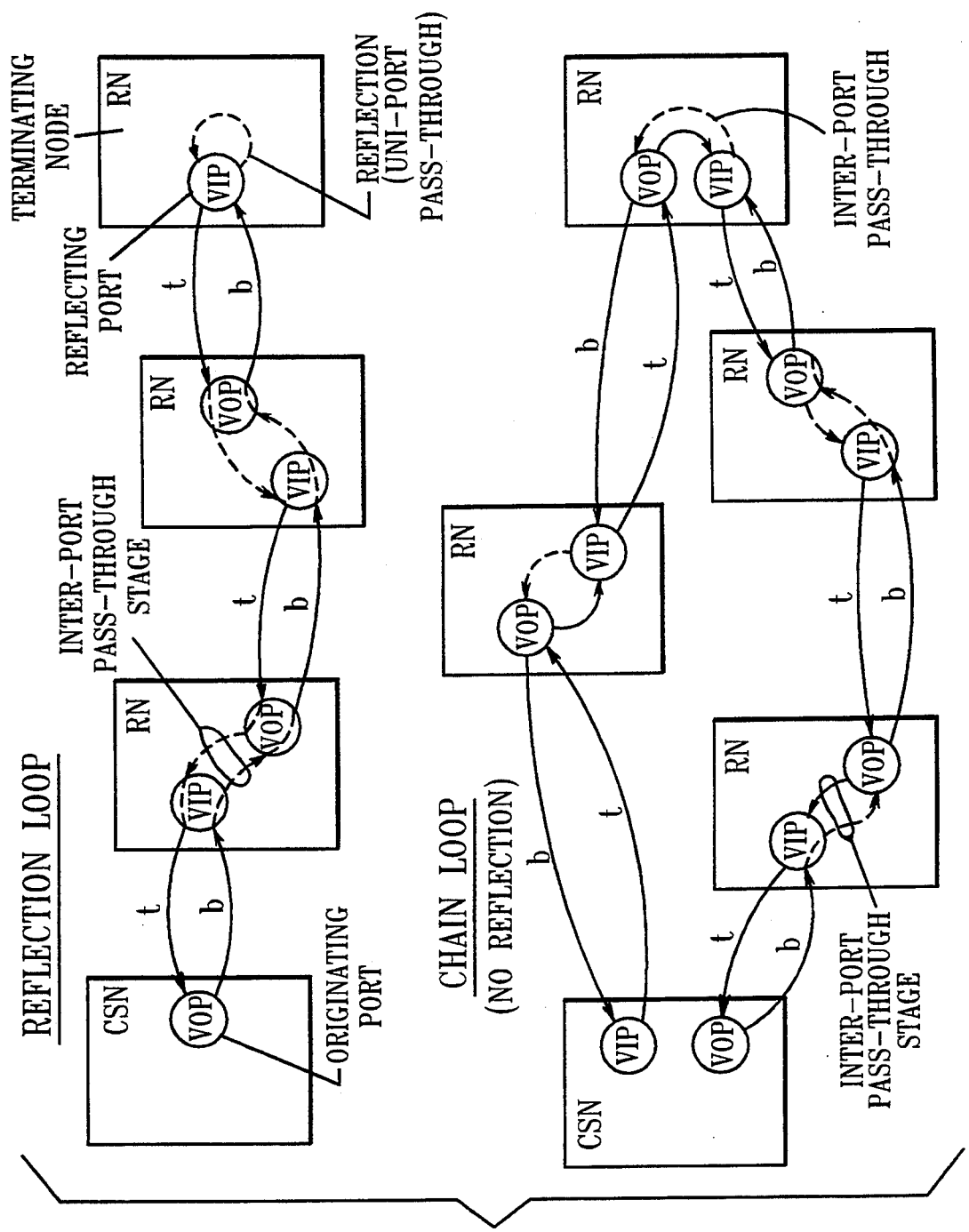
FIG. 14 is a diagram illustrating the chain loops and reflection loops used in the preferred embodiment.

A chain loop, as its name implies, is a transmission chain which begins and ends at the CSN. As shown in FIG. 14, a chain loop creates two separate string loops, a byte loop and a token loop, that thread through precisely the same ports, but in opposite directions. Note that there is no reflection in a chain loop: signals originating at the CSN as bytes or tokens always return to the CSN in the same form, via their respective loop.

Reflection at nodes is implemented entirely within the VIPs. Each VIP has its own reflection capability which can be turned on and off by service messages much like pass-through is controlled.

Figure 15:
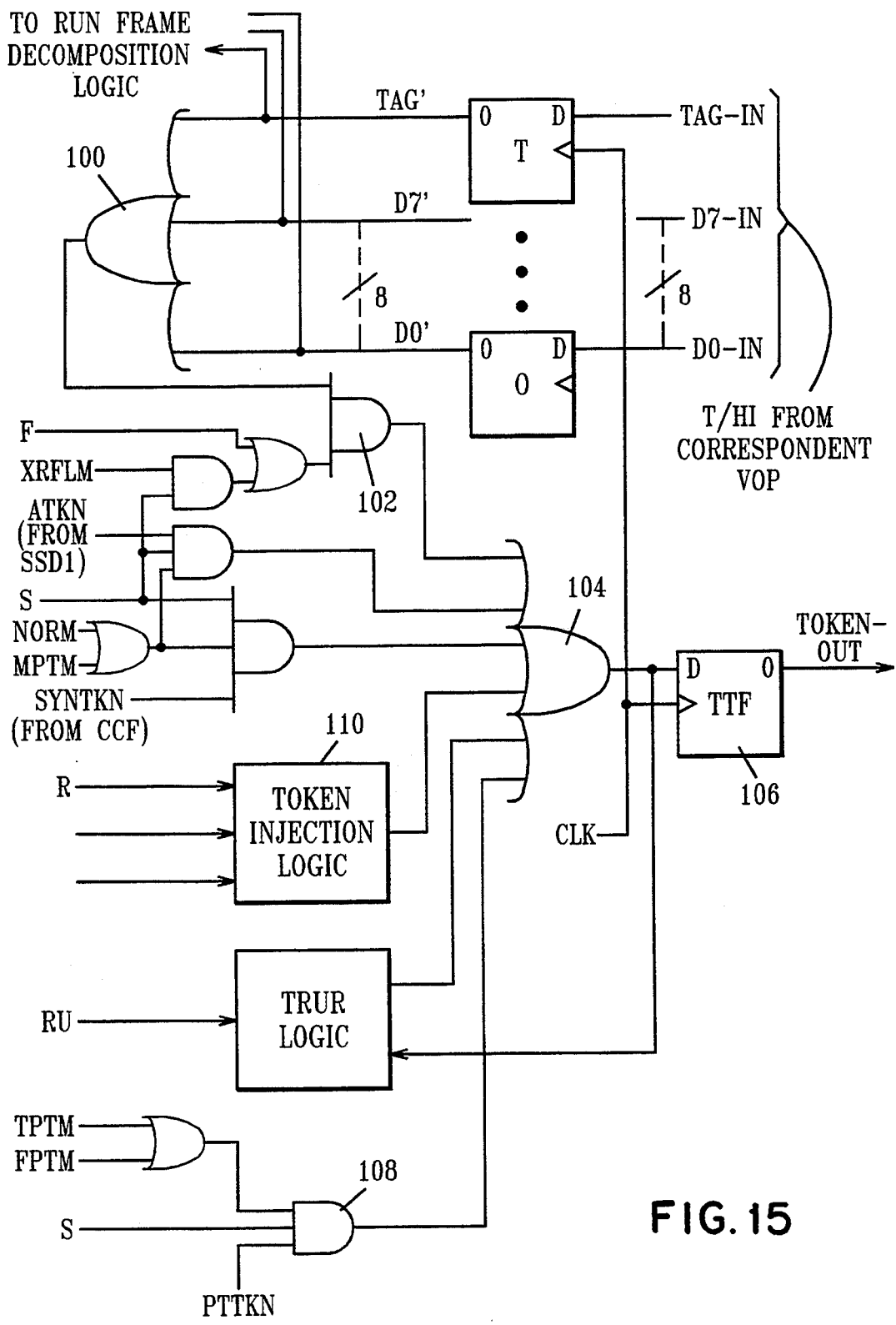
FIG. 15 is a logic diagram describing the reflection and pass-through logic at the input port of a duplex channel.

Illustrative of reflection logic is that of the VIP of a VDC, and this logic, along with a fragment of the VDC's pass-through logic, is shown in FIG. 15. T/HL signals incoming at the upper-right of the figure are latched at the nine receive flip-flops (0, 1, . . . ,7,T), then ORed (100) for selective routing (via AND gate 102) to the token transmit flip-flop 106, via the OR gate 104. The pass-through token (PTTKN), incoming from the VOP (not shown) is selectively routed (via the AND gate 108) to the token transmit flip-flop (106), also via the OR gate 104. Selective enabling of AND gates 102 and 108 thus determine the reflection/pass-through action of the VIP. If both of these synchronization mechanisms are concurrently disabled, the token injection logic (110) can be enabled for ordinary flow control. It will be understood by those skilled in the art that the pass-through routing of the T/HL signals of FIG. 15, though not shown, is achieved by routing the outputs of the nine receive flip-flops to the VOP.

Illustrative Service Message

A typical service message, namely Load Channel Time Counter (LCTC), is described by FIG. 16. The figure indicates the format used and also provides an execution description. LCTC is the synchronization message of the preferred embodiment.

The first byte of the message defines the message length (L), a non-zero integer. The second byte, called the command byte, is an eight-bit code that defines the operation to be performed by the target channel which, in this case, is operation '01', LCTC. Byte 3 of the service message is the message identifier (MID). This byte controls channel selection as the message propagates along a string. Channels whose preestablished address matches that of the MID execute the message. Those whose address does not match the MID simply pass the message through, i.e., they engage in passive pass-through.

Methodology of the Preferred Embodiment

Figure 10B:
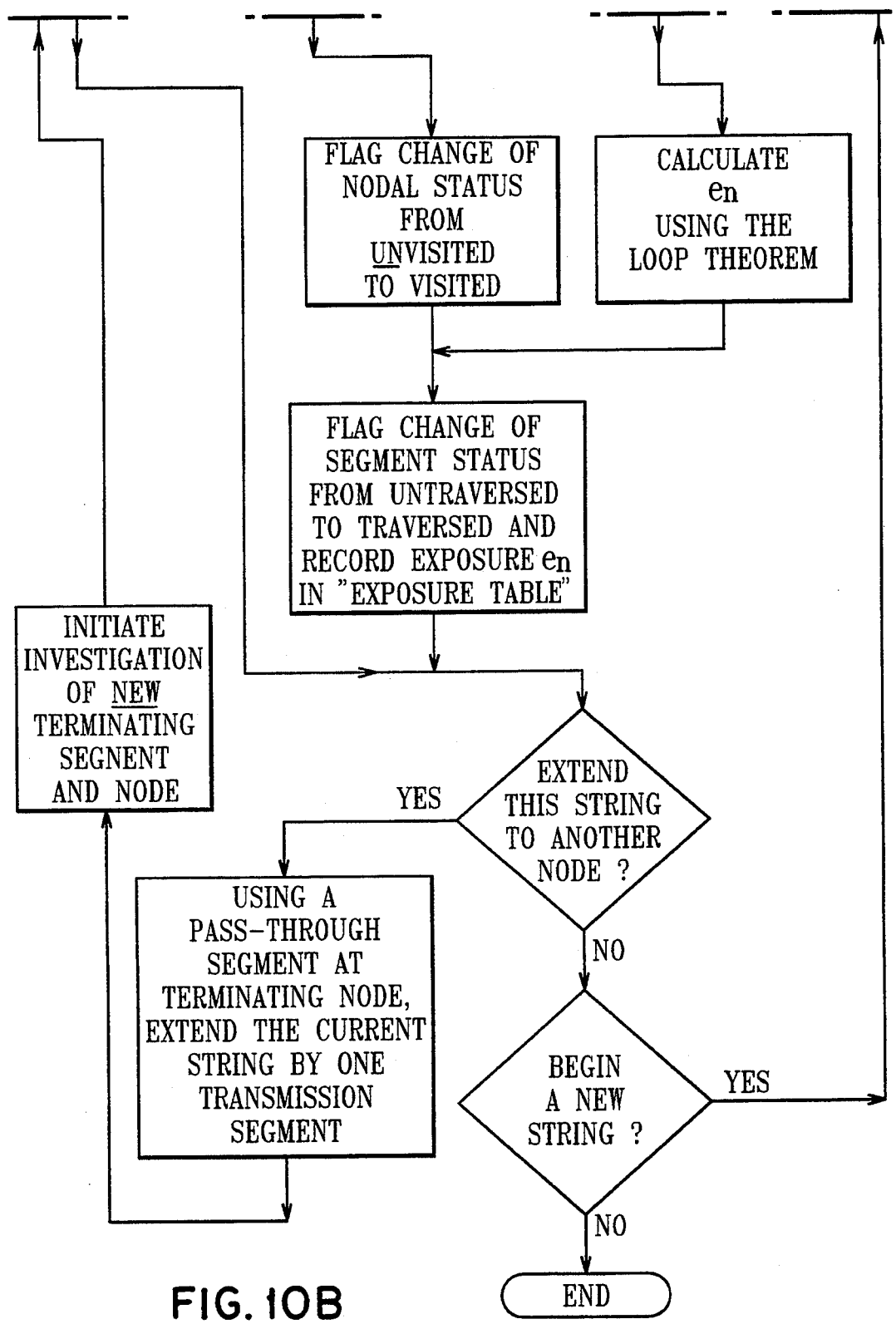
FIG. 10 is a flowchart diagram describing the methodology of the invention.
Figure 11:
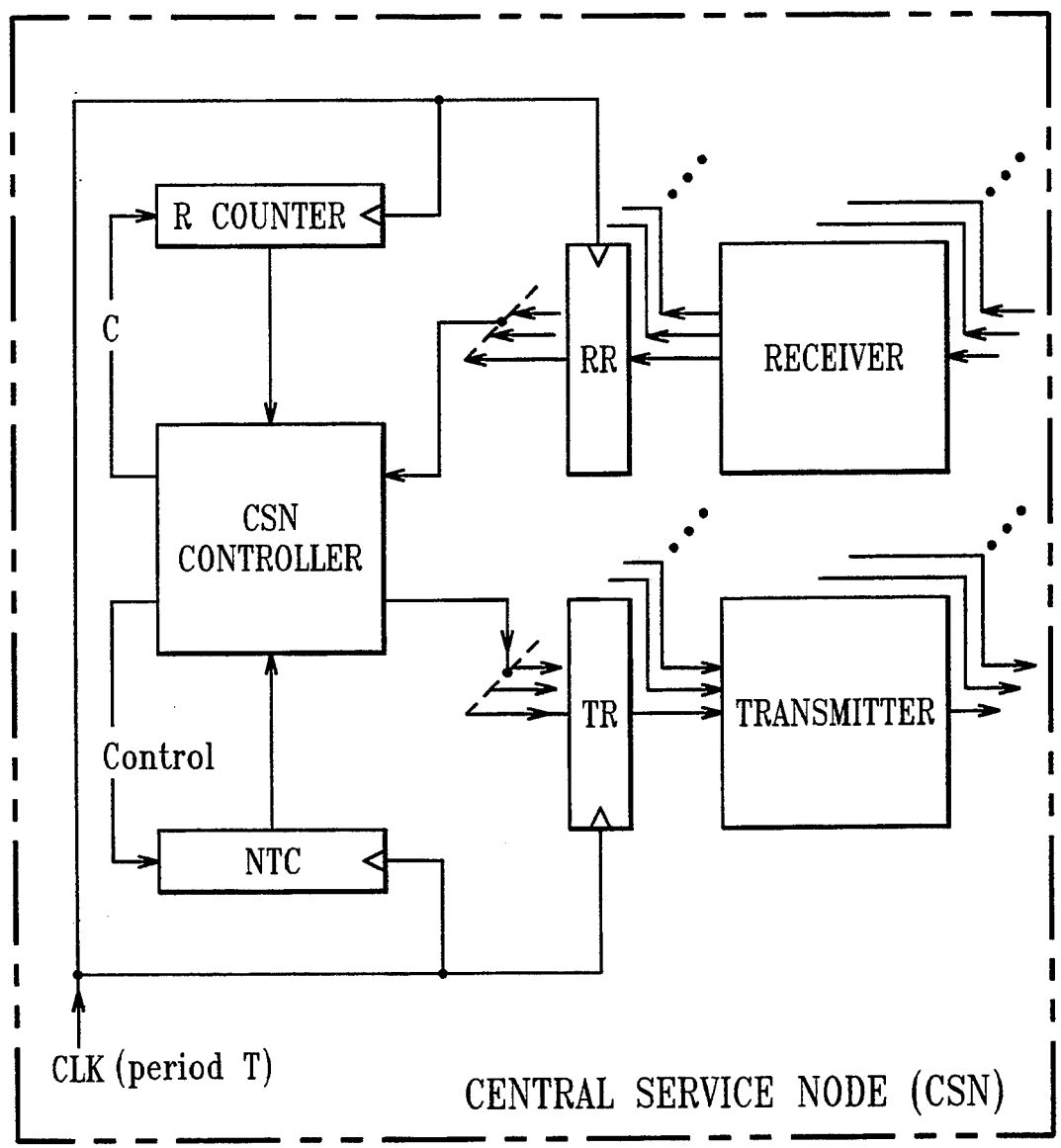
FIG. 11 is a diagram that defines the apparatus of the invention at the Central Service Node (CSN).
Figure 12:
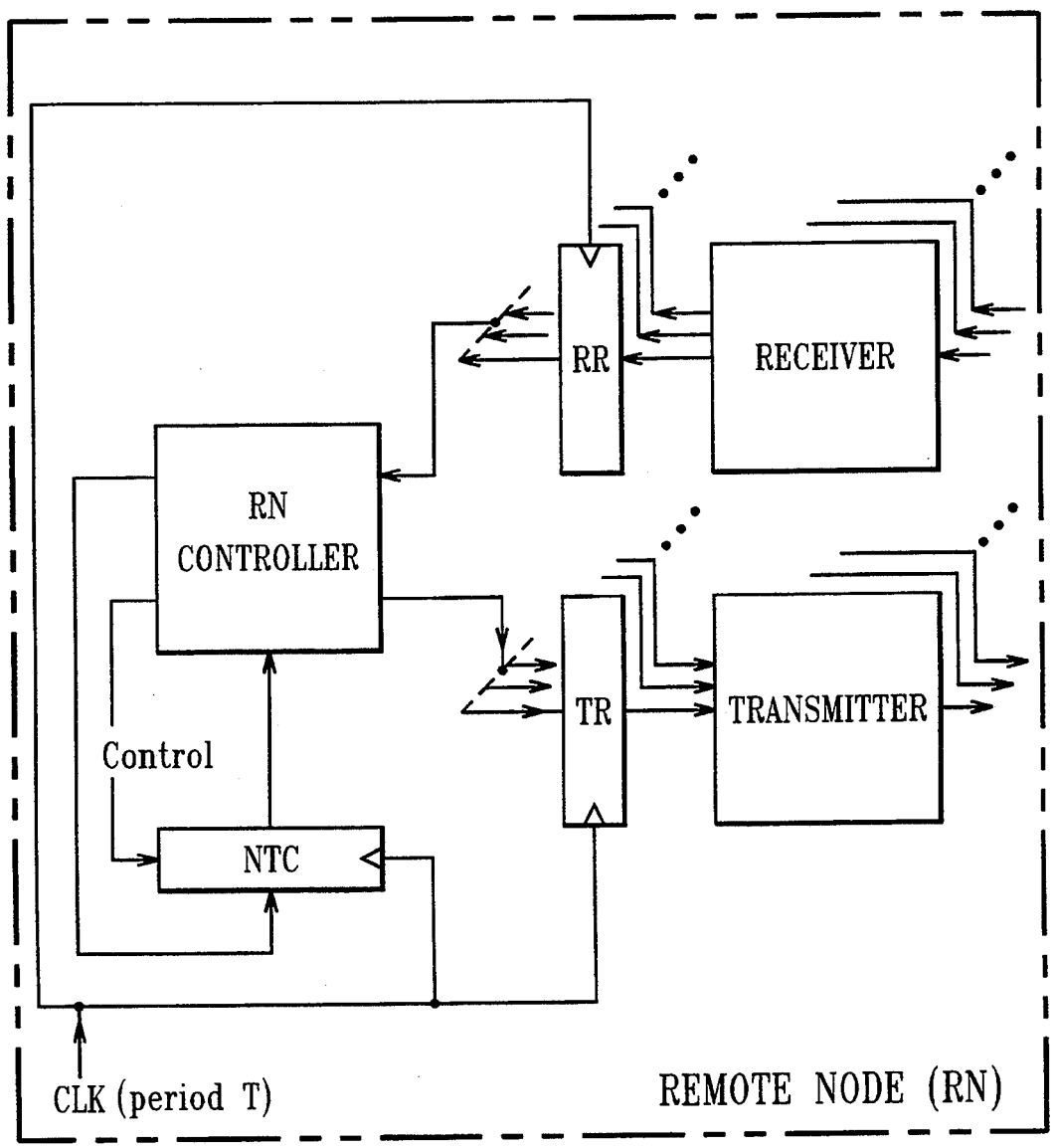
FIG. 12 is a diagram that defines the apparatus of the invention at a Remote Node (RN).
Figure 17A:
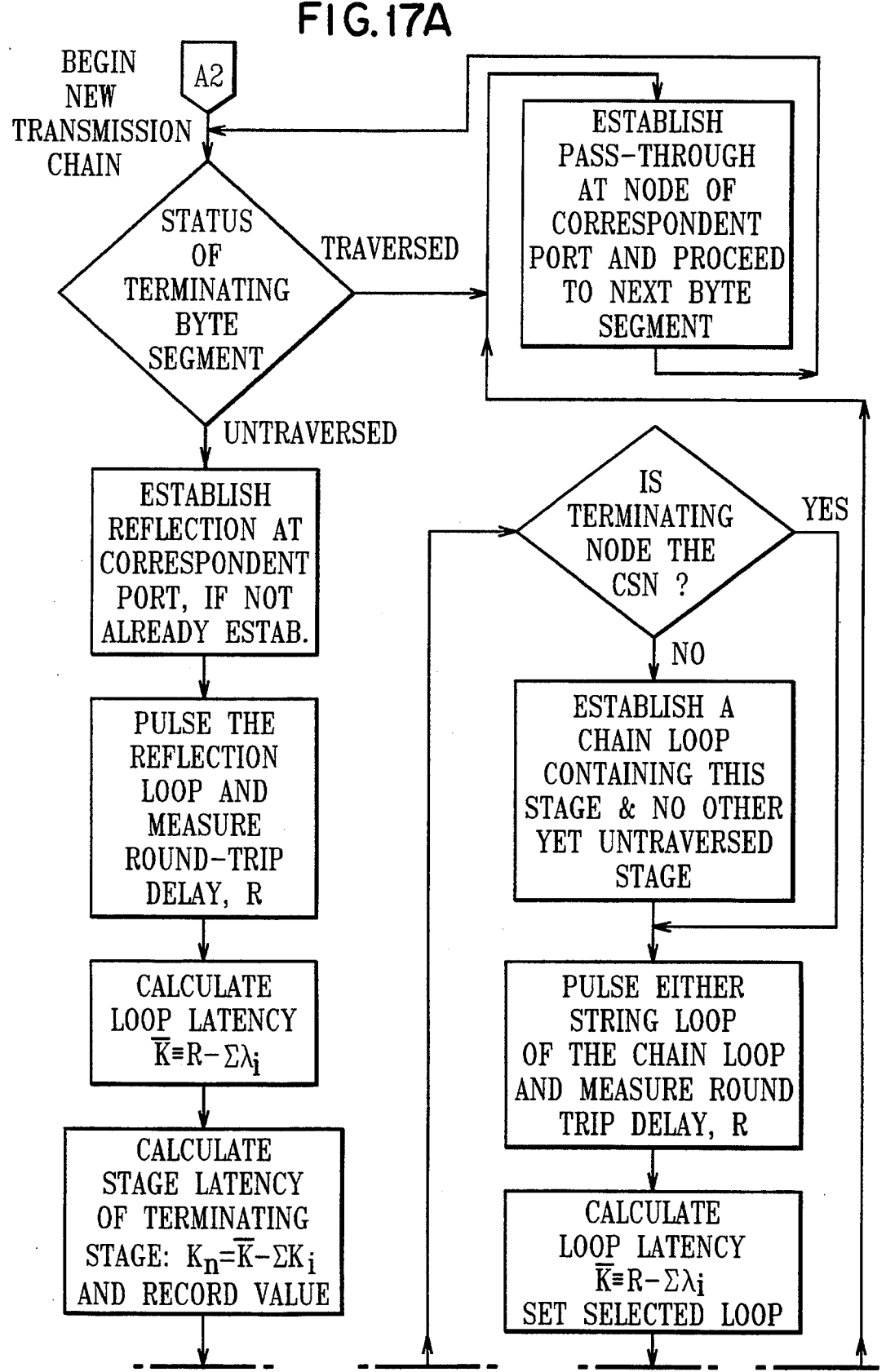
FIG. 17 is a flowchart diagram describing the methodology of the invention as adapted for the preferred embodiment.
Figure 17B:
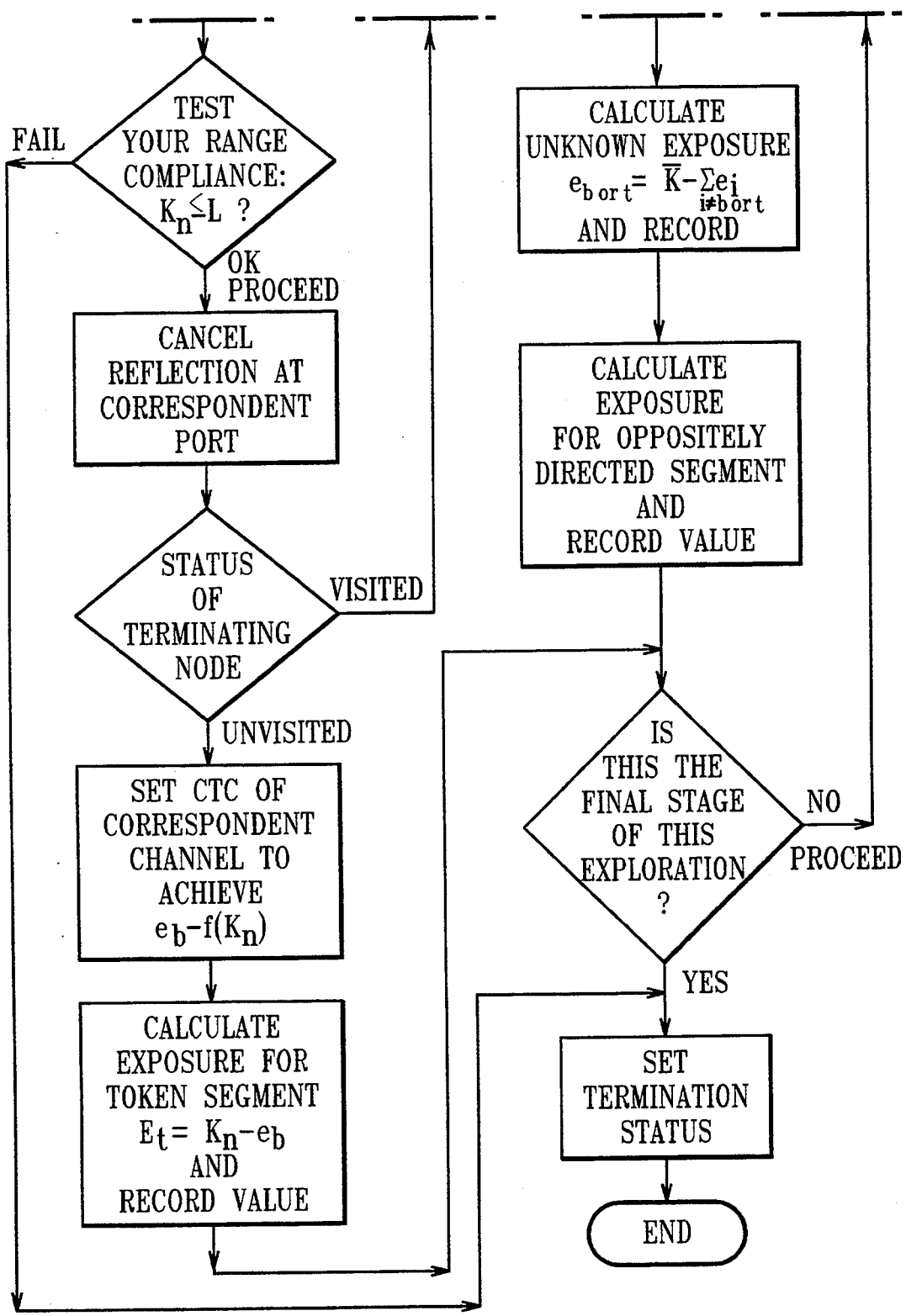

The methodology used for establishing and determining virtual transmission delays in the network of FIG. 13 is summarized in flowchart form in FIG. 17. This methodology is an adaptation of the methodology of the invention (FIG. 10) to transmission chains and reflection loops. As will be recognized by those skilled in the art, the nodal composition of the chains and the order in which they are created are not specified by the invention. These choices are arbitrary and in practice will depend upon the network topology and the preferences of the system designer. The specific approach that is described in what follows has been contrived solely to foster an understanding of the invention. It is not necessarily the one that would be used in practice.

Task 1: Setting the CTCs

For the network of FIG. 13, there are twenty-four channels and, therefore, twenty-four channel time counters (CTCs). At the outset, all of the CTCs are "ticking" with unknown relative offset. The objective is to establish and record a basal distribution of exposure for the network, one that satisfies the exposure constraints of Equation (2) for each and every transmission stage. CTC settings will therefore have to be changed.

As the CSN takes its first look into the network, it sees SN0 to which it is connected by a duplex stage. All it can do at this point is execute flowchart steps B2, C2, ..., G2, H2, B3, E3, H3, and J3, for the stage whose byte segment is directed to SN0, namely stage 9/0. This sequence of steps will fix and determine $e_b$, $e_t$, and K for that stage, while also setting the CTC of SN0. There is no other alternative to this action, according to FIG. 17, when working outward from a VDC. This same sequence of steps is used repeatedly in what follows, so it is convenient to give the sequence a name: the set clock (sc) sequence. The sc sequence affects only one transmission stage at a time, namely the last stage of the associated transmission chain.

Figure 18A:
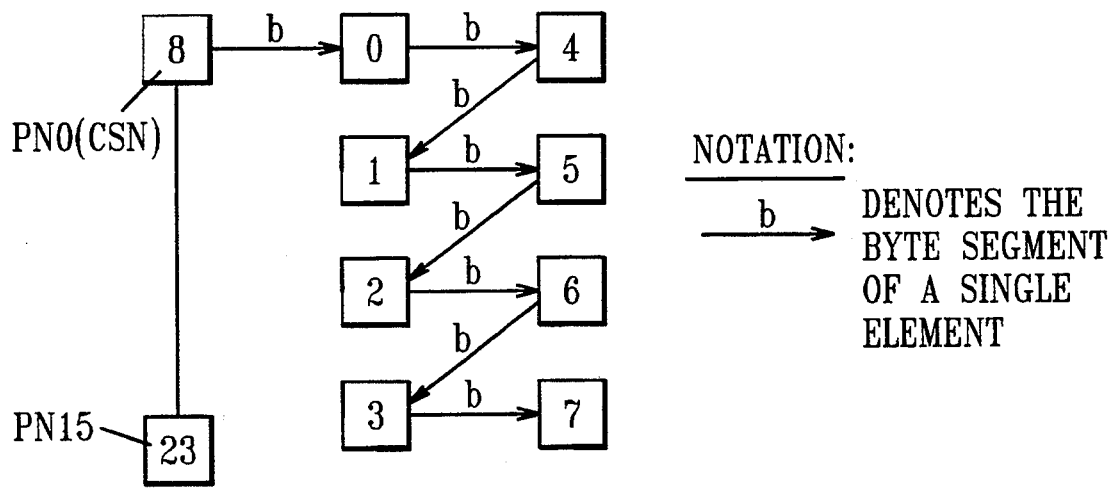
FIG. 18 is a diagram illustrating a particular scheme for setting the CTCs of a twenty-four node network using only one stage of each duplex stage.

Having set CTC/0, the CSN is now faced with a number of pass-through choices at SN0, eight, in fact, corresponding to the number of VOPs at SN0. For purposes of illustration, it is assumed that the CSN chooses to extend the transmission chain to SN4, then to SN1, SN5, etc. . . . as shown in FIG. 18 (where the processor nodes have been renumbered to simplify the notation). The next step, therefore, is to pass from SN0 to SN4, as described by step K1 in the flowchart of FIG. 17. Step K1 is performed by sending a service message to SN0 that directs it to establish a pass-through stage comprising the receiving VIP and the VOP that connects SN0 to SN4. Once this pass-through stage has been established, an sc sequence is performed with transmission stage 0/4 as the terminating stage, the notation 0/4 corresponding to the direction of the byte segment of that stage. (Stage 4/0 is therefore the other stage, the companion stage, of the parent duplex stage.) This sc sequence thus fixes and determines $e_b$, $e_t$, and K for stage 0/4 and also sets the CTS of SN4 (CTC/4). Similar steps are performed repeatedly, extending the transmission chain one stage at a time. After eight such executions of the sc sequence (including the one that initialized SN0, the CTCs of all switch nodes of the network will have been set by the CSN and all transmission parameters along the working chain will have been established and recorded.

Figure 18B:
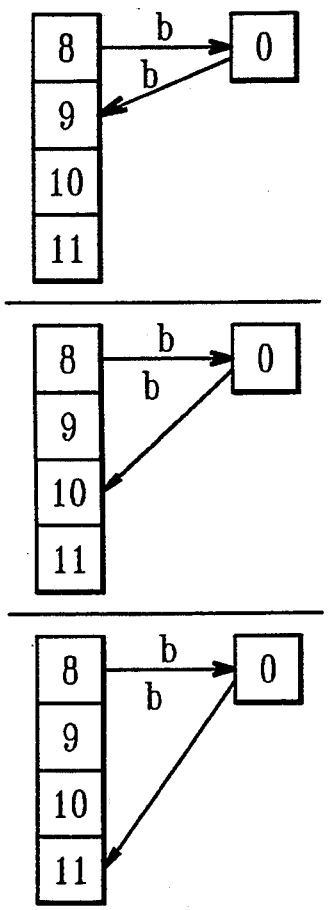
Figure 18C:
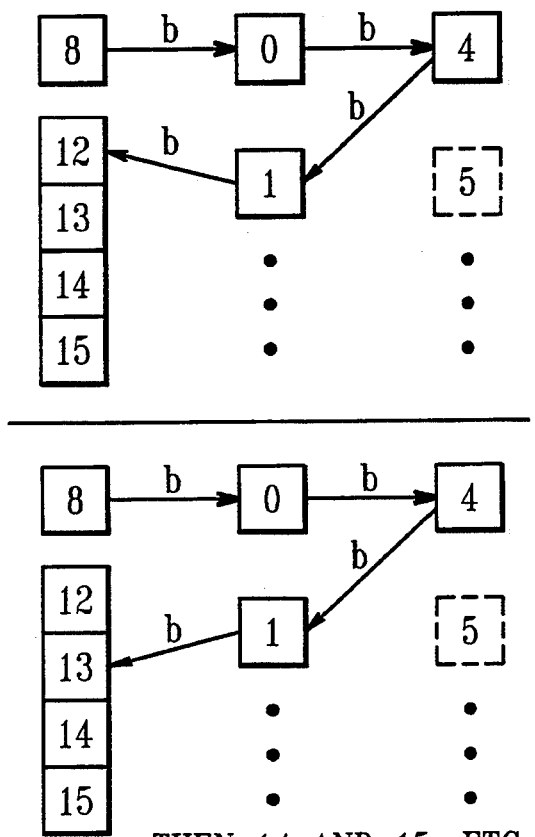

Next, it is necessary to set the CTCs of processing nodes 1–15 (renumbered in FIG. 18 as nodes 8–23). A scheme for doing this begins as shown in FIG. 18b. The CSN forms a succession of three separate, two-stage chains: 8-0-9, 8-0-10, and 8-0-11. For each chain, an sc sequence is performed which sets the CTC at the corresponding processing node. Nodes 12–15 are similarly set up, using four variations of a four-stage chain, as shown in FIG. 18c. The remaining processor nodes, and the connecting stages, are processed similarly, using six-stage and eight-stage chains. Although not shown in FIG. 18, these steps can be readily visualized from what has been described thus far.

Task 1 is now complete: all twenty-three CTCs of the network have been initialized, and exposure (vtd) and stage latency (K) have been measured and recorded for each of twenty-three distinct transmission stages.

Task 2: To Proceed, or Not to Proceed?

As observed earlier, the network of FIG. 13 comprises thirty-two duplex stages. Thus Task 1 was accomplished without having "touched" forty-one transmission stages, the twenty-three companion stages to the ones traversed, plus nine duplex stages. Exposure and stage latency for each of these untraversed stages is therefore unknown. The following question thus arises, dictated by the presence of TPMPX-type channels in the preferred embodiment: Are the steps thus far performed sufficient to guarantee that exposure is properly bounded within each of the untraversed stages? The answer to this question hinges on the physical properties of the network. It can be shown that if all transmission stages are symmetrical, meaning that segment latencies (rtd) are equal for each stage, and if the stage latency of each stage is neither too large nor too small within the range $0 \leq K \leq 2Q$, then the answer is affirmative, the yet untraversed links will satisfy Equation (2).

Thus, because phase-multiplexed systems conform to the necessary conditions, it would, in the absence of other considerations, be unnecessary to pursue the procedure further, even though some two-thirds of the stages have not been investigated. With the phase multiplexed design, however, there are other considerations, namely the need to initialize all slot-in/out counters, and for this purpose exposure must be known for each and every transmission segment of the network. It is necessary, therefore, to proceed, and the remaining steps of the methodology are described in what follows.

Task 3: Investigating the First Companion Stage

Referring to FIG. 18, it will be seen that of the stages traversed, no companion stage was ever used in the process of setting the CTCs: the entire process was achieved by working steadily outward from VOP to VIP, one transmission stage at a time. As will be seen, the remainder of the network must be investigated using chain loops, and this means that stage 0/8 will be the terminating stage for each one of these loops. A knowledge of its transmission parameters is therefore mandatory.

Figure 19:
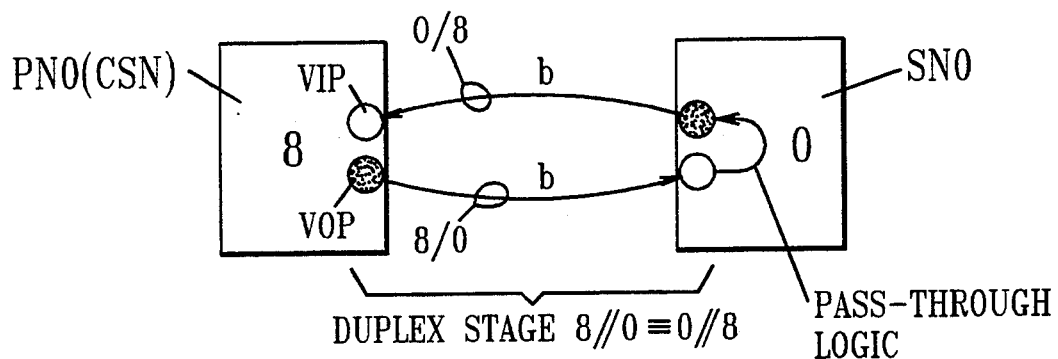
FIG. 19 is a diagram illustrating the duplex stage of the preferred embodiment that connects the CSN directly to a switch node, SNO.

The particulars of the duplex stage connecting PN0 and SN0 are shown in FIG. 19. Again, the stages are numbered according to the direction of the corresponding byte segment, and only those segments are shown in the figure. The first step is to determine $K_{0/8}$, $K_{8/0}$ being already known. Thus, the CSN strikes out with a new chain, this time comprising stages 8/0 and 0/8, i.e., a chain loop. The procedure is described in FIG. 17 beginning at B2, where the answer now is "traversed", and progresses, therefore, directly to K1. At K1, a service message directed to SNO establishes pass-through, this time back to PNO and not to SN4, as was the case for Task 1. This pass-through is indicated in FIG. 19. The procedure thus continues from B2 through steps C2, D2, etc . . . by which stage latency $K_{0/8}$ is determined. This time, however, at step B3 and for the first time herein, an affirmative answer is obtained: an extract exposure sequence is now underway. Step D4 is skipped here, a chain loop is already in place, comprising only the transmission stages of the duplex stage under investigation. At step E4, a token pulse is used to measure the round-trip delay for the token loop. A token pulse originating at VIP/8, propagating to VOP/0, then through the pass-through logic of SNO, passes back to PNO, via the token segment of stage 8/0 (not shown in the figure, but implied). The measured round-trip propagation time R is used to calculate token loop latency in step F4, and the unknown token exposure is calculated in step G4:

$$e_{t0/8} = K - e_{t8/0}.$$

$e_{t8/0}$, it will be remembered, was determined and recorded early on during step H3 of Task 1. The exposure for the byte segment of stage 0/8 then follows from step H4:

$$e_{b0/8} = K - e_{t0/8}$$

where K is the stage latency (not loop latency) determined in step F2.

Having so determined the exposure for each of the segments of stage 0/8, they are duly recorded by the CSN and checked for compliance against the bounds given by Equations (1). Alternatively, either segment exposure can be checked against Equation (2). If there is a non-compliance, adjustment of the present settings of the CTCs will be required. Such adjustment is not attempted, however, until all of the yet untraversed stages have been examined, i.e., until the basal exposure distribution for the entire network has been determined.

Task 4: Investigating a Next Stage

Figure 20:
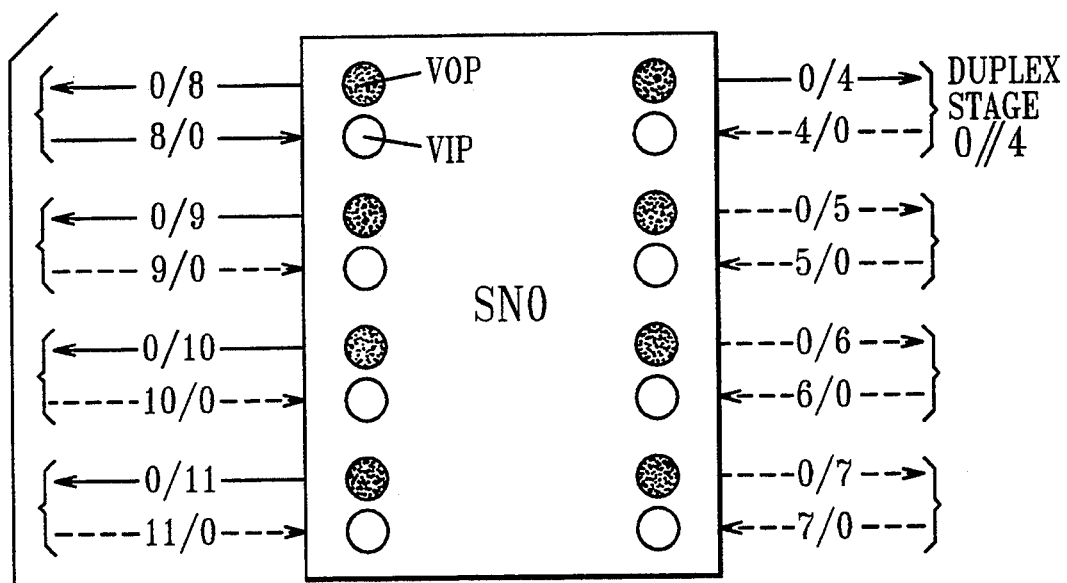
FIG. 20 is a diagram describing the status of the stages associated with SNO of the preferred embodiment, after the CSN has processed duplex stage O//8 in Task 3 of the methodology execution example.

Again, as was the case for Task 1, the CSN finds itself at SNO with several alternatives for pass-through, this time seven (see FIG. 20), corresponding to all of the VOPs other than the one associated with stage 0/8, an already traversed stage. However, in this case, because of the order in which the method has been applied thus far, only four of these choices are viable.

Figure 21:
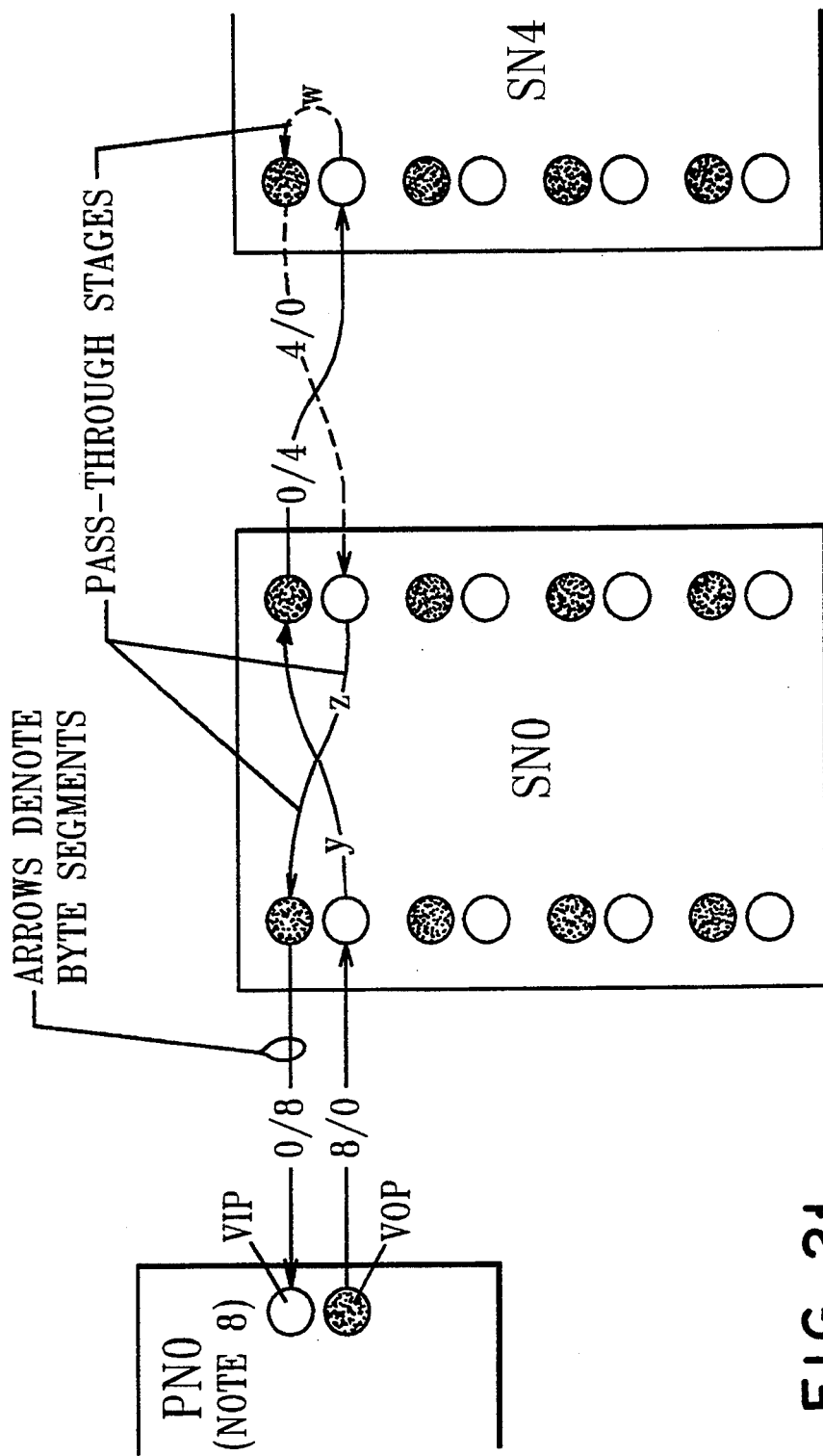
FIG. 21 is a diagram of the chain loop necessary for determining vtd within stage 4/0 of the methodology execution example, a stage of which CTC settings at both ends are already fixed.

To illustrate why this is so, imagine that the CSN chooses to examine stage 4/0. It does this (see FIG. 21) by creating a three-stage transmission chain beginning with stage 8/0, passing through SNO at y, progressing with stage 0/4, then passing through SN4 at w, and ending with stage 4/0, an untraversed stage. At this point, the methodology of FIG. 17 has progressed to step D4 where a chain loop is required that includes no other yet untraversed stage. The only choice, therefore, is to establish a second pass-through at SNO (denoted by the letter z in FIG. 21) and complete the chain loop with stage 0/8. Once this is done, it is then possible to complete the investigation by progressing through steps E4, . . . , H4, J3, and ending with K3. (It may be noted parenthetically that the pass-through stage z is an example of the "back-pass-through" function described earlier).

Thus, it may be observed that there are only three other stages (9/0, 10/0, and 11/0) that can be resolved in this manner, namely by creating a chain loop containing only one yet untraversed stage. The remaining stages (0//5, 0//6, and /007, the double slash signifying a duplex stage) must be resolved with more complex chains, as described in Task 5.

Task 5: Moving On

Having cataloged stage 0//4, it is now possible to proceed further into the network, for example by moving on to SN1 (see FIG. 18a) and then examining stage 1/4, the companion stage to the already traversed stage 4/1. Regardless of the chosen path, the procedure always involves the generation and analysis of transmission chains precisely in accord with the steps set forth in the flowchart of FIG. 17.

It is worthwhile noting that whenever it is known at the outset that all stages must be traversed, it does make sense to move forward with a breadth-first strategy rather than a depth-first strategy, such as the one illustrated. The breadth-first approach provides progressive processing of both stages of each duplex stage, thereby making it easier to establish chain loops whenever they are needed.

Irrespective of the fact that a specific embodiment of the invention is herein described, it will be understood by those skilled in the art that variations in form and detail may be made therein without departing from the spirit and scope of the invention. Having thus described this invention, what we claim as new is:

We claim:

1. For use by a particular node within a digital data communications network having a plurality of counter-synchronized nodes including the particular node, called a central service node, defined as CSN, and at least one remote node; all nodes being clocked at a common frequency; each node being synchronized by its own nodal time counter and connected to at least one other node by at least one transmission segment that completes a transmission path from the central service node; at least one remote node providing at least one pass-through segment by which signals being received from a transmission segment terminating at that node can be passed to and transmitted by another transmission segment originating at that node, each said pass-through segment having a pass-through delay known by said central service node; said network providing means for said central service node to establish among the plurality of nodes at least one string of segments originating at said central service node, a method for establishing basal distributions of virtual transmission delay, defined as exposure, throughout the network and determining elements thereof, comprising the steps of:

(a) beginning a string, by selecting a first transmission segment;

(b) making a determination as to the segment status of the terminating segment of a current string, said segment status being defined as (1) traversed, if an exposure at the terminating segment is known by the central service node, and (2) untraversed, if the exposure at the termination segment is not known by the central service node;

(c) proceeding as follows, according to the segment status determination made in step (b):

| segment status (terminating segment) | proceed to step |
|---|---|
| untraversed | (d) |
| traversed | (i) |

(d) making a determination as to a nodal status of the terminating node of said string, said nodal status being defined as (1) visited, if the nodal time counter of the terminating node has already been initialized by said central service node, or if the terminating node is also the central service node itself, and (2) unvisited, if not visited, (e) proceeding as follows, according to the nodal status determination made in step (d): nodal status terminating node proceed to step

| visited | not the CSN | (l) |
|---|---|---|
| visited | CSN | (m) |
| unvisited | not the CSN (implied) | (f) |

(f) initializing the nodal time counter at the terminating node of said string, to establish any desired value of exposure for the terminating segment of said string;

(g) flagging the change of nodal status of the terminating node of said string, from unvisited to visited;

(h) flagging the change of segment status of the terminating segment of said string, from untraversed to traversed, and recording the exposure established by step (f) for said terminating segment;

(i) making a determination as to whether or not it is desired to extend said string to another node, and proceeding according to that determination as follows:

| determination | proceed to step |
|---|---|
| extend string | (j) |
| do not extend string | (q) |

(j) extending said string to another node, using a pass-through segment at said terminating node;

(k) establishing a new terminating segment and a new terminating node, corresponding to the extended string created by step (j), and returning to step (b);

(l) creating a loop, comprising said string extended by any previously traversed transmission segments and pass-through segments needed to complete said loop;

(m) transmitting a signal through the segment loop created in step (j) or step (l), said signal subsequently returning to said central service node;

(n) measuring the round-trip delay of the signal transmitted in step (m);

(o) calculating exposure for the terminating segment of said string, using the round-trip delay measured in step (n) and the known exposures and pass-through delays of said loop;

(p) flagging the change of segment status of the termination segment of said string, from untraversed to traversed, recording the exposure for said terminating segment determined by step (o), and then proceeding to step (i);

(q) making a determination as to whether or not there are yet untraversed transmission segments within the network and proceeding according to that determination as follows:

determination action there are yet untraversed segments return to (a) there are no remaining untraversed segments end of method.

2. The method of claim 1 wherein step (f) comprises transmitting through said string a synchronization message directed to said terminating node, said synchronization message indicating a nodal time value to which said nodal time counter is to be initialized, and said terminating node responding to said synchronization message by accordingly initializing its nodal time counter.

3. The method of claim 2 wherein said nodal time value is the sum of the virtual transmission delays corresponding to each transmission segment of said string, pass-through delays corresponding to each pass-through segment of said string, reference time corresponding to the time of said synchronization message by a central service node, and a known execution delay at said terminating node, said execution delay commencing at the capture time of said synchronization message.

4. The method of claim 1 wherein step (n) is performed with a counter that begins counting at a time corresponding to the time of transmission of said signal of stem (m) and stops counting a time corresponding to the time said signal subsequently returns to said central service node, said round-trip delay corresponding to the count thereby obtained.

5. The method of claim 1 wherein said exposure at the terminating segment of said string is calculated in step (o) by subtracting from said round-trip delay the sum of all pass-through delays and all other exposures associated with said loop.

6. For use by a particular node within a digital data communications network having a plurality of counter-synchronized nodes including the particular node, called a central service node, and at least one remote node; all nodes being clocked at a common frequently; each node being synchronized by its own nodal time counter and connected to at least one other node by at least one transmission segment that completes a transmission path from the central service node; at least one remote node providing at least one pass-through segment by which signals being received from a transmission segment terminating at that node can be passed to and transmitted by another transmission segment originating at that node, each said pass-through segment having a pass-through delay known by said central service node; said network providing means for said central service node to establish among the plurality of nodes at least one string of segments originating at said central service node, a method for establishing a particular value of virtual transmission delay, defined as exposure, at any particular transmission segment within said network, comprising the steps of:

(a) creating a string in which said particular transmission segment is the terminating segment and for which an exposure at all other transmission segments of said string is known by the central service node; and (b) transmitting through said string a synchronization message directed to the terminating node of said string, said synchronization message indicating the nodal time value to which the nodal time counter of said terminating node is to be set in order to achieve said particular value of virtual transmission delay, and said terminating node responding to said synchronization message by accordingly initializing its nodal time counter.

7. The method of claim 6 wherein said nodal time value in step (b) is the sum of the virtual transmission delays corresponding to each transmission segment of said string, the pass-through delays corresponding to each pass-through segment of said string, reference time corresponding to the time of transmission of said synchronization message by the central service node, and the known execution delay at said terminating node, said execution delay commencing at the capture time of said synchronization message.

8. For use by a particular node within a digital data communications network having a plurality of counter-synchronized nodes including the particular node, called the central service node, and at least one remote node; all nodes being clocked at a common frequency; each node being synchronized by its own nodal time counter and connected to at least one other node by at least one transmission segment that completes a transmission path from the central service node; at least one remote node providing at least one pass-through segment by which signals being received from a transmission segment terminating at that node can be passed to and transmitted by another transmission segment originating at that node, each said pass-through segment having a pass-through delay known by said central service node; said network providing means for said central service node to establish among the plurality of nodes at least one string of segments originating at said central service node, a non-destructive method for determining the existing virtual transmission delay, defined as exposure, at any particular transmission segment within said network, comprising the steps of:
- (a) creating a loop containing said particular transmission segment and any other transmission segment whose virtual transmission delay is known to said central service node;
- (b) transmitting through said loop a signal, said signal subsequently returning to said central service node;
- (c) measuring the round-trip delay of the signal transmitted in step (b); and
- (d) calculating exposure for said particular transmission segment, using the round-trip delay measured in step (c) and the known delay for each other segment of the loop.

9. The method of claim 8 wherein step (c) is performed with a counter that begins counting at a time corresponding to the time of transmission of said signal of step (b) and stops counting a time corresponding to the time said signal subsequently returns to said central service node, said round-trip delay corresponding to the count thereby obtained.

10. The method of claim 8 wherein the existing virtual transmission delay corresponding to said particular transmission segment is calculated in step (d) by subtracting from said round-trip delay the sum of all pass-through delays and all other exposures associated with said loop.

11. A digital data communications network having a plurality of counter-synchronized nodes including a central service node and at least one remote node, all nodes being clocked at a common frequency, each node being synchronized by its own nodal time counter, each node being connected to at least one other node by at least one transmission segment that completes a transmission path from the central service node, at least one remote node providing at least one pass-through segment by which signals being received from a transmission segment terminating at that node can be passed to and transmitted by another transmission segment originating at that node, said central service node comprising:
- at least one receiver which conditions incoming signals from a nodal transmitter for latching within said central service node;
- at least one receive register, its input connected to the output of a receiver, for latching incoming signals;
- at least one transmitter, by which signals originating at said central service node are conditioned for transmission to a nodal receiver;
- at least one transmit register, its output connected to the input of a transmitter, for latching outbound signals;
- a controller, connected to the output of each receive register and to the input of each transmit register, providing means for (a) acting on signals received by way of any said receive register, (b) generating a control message set, and (c) transmitting any control message of said control message set via any said transmit register;
- a nodal time counter, its output connected to said control means, by which said control means synchronizes outbound signals;

at least one said remote node comprising:
- at least one receiver, by which incoming signals from a nodal transmitter are conditioned for latching within said remote node;
- at least one receive register, its input connected to the output of a receiver, for latching incoming signals;
- at least one transmitter, by which signals originating within said remote node are conditioned for transmission to a nodal receiver;
- at least one transmit register, its output connected to the input of a transmitter, for latching outbound signals;
- a controller, connected to the output of each receive register and to the input of each transmit register, providing means for (a) executing incoming control messages from said central service node, and (b) passing incoming signals from any receive register to any transmit register;
- a nodal time counter, its output and input connected to said control means, by which said control means synchronizes incoming signals;

said transmission segment comprising:
- a transmit register and its associated transmitter, located within any node;
- a receive register and its associated receiver, located within any node; and
- an interconnecting link of any physical form, linking the output of said associated transmitter with the input of said associated receiver;
- said transmission segment thereby providing means for synchronous, unidirectional, inter-node information transfer;

said nodal pass-through segment comprising:
- a receive register;
- a transmit register;
- non-specific pass-through logic connecting the output of said receive register with the input of said transmit register.

12. The network of claim 11 wherein said central service node further comprises a round-trip delay counter connected to said control logic of said central service node, said control logic further providing means to reset, sense, and selectively start and stop said round-trip delay counter.

13. The network of claim 11 wherein said control message set includes a string conditioning message, said string conditioning message being designed to establish among the plurality of nodes at least one string of segments originating at said central service node and terminating at any other node, said string comprising at least one transmission segment concatenated with any number, including zero, of pass-through segment always separates transmission segments, said string always terminating with a transmission segment.

14. The network of claim 13 wherein (a) said control message set further includes a synchronization message that can be directed at the terminating node of said string, said synchronization message indicating the nodal time to which the nodal time counter at said terminating node is to be initialized, and (b) said control logic of the central service node further includes means for transmitting said synchronization message at a particular reference time, said nodal time indicated by said synchronization message incorporating said reference time.

15. The network of claim 14 wherein (a) the control logic of said terminating node further includes means for executing said synchronization message with an execution delay known to said central service node, said execution delay being measured from the capture time of said synchronization message, and (b) said nodal time indicated by said synchronization message also incorporates said execution delay.

16. The network of claim 11 wherein:
(a) said control message set includes a pass-through synchronization message that can be directed by way of a plurality of intermediate nodes to a particular node of said network, said pass-through synchronization message indicating (1) the particular pass-through segment to be used by each intermediate node, and (2) the nodal time to which the nodal time counter at said particular node is to be initialized;
(b) said control logic of the central service node further includes means for transmitting said pass-through synchronization message at a particular reference time, said nodal time indicated by said pass-through synchronization message incorporating said reference time.

17. The network of claim 16 wherein (a) the control logic of said particular node further includes means for executing said synchronization message with an execution delay known to said central service node, said execution delay being measured from the capture time of said synchronization message, and (b) said nodal time indicated by said synchronization message also incorporates said execution delay.

18. The network of claim 12 wherein said control message set includes a loop conditioning message, said loop conditioning message being designed to establish among the plurality of nodes a loop of segments originating and terminating at said central service node, said loop comprising a plurality of transmission segments concatenated with pass-through segments sequenced alternately so that a pass-through segment always separates transmission segments, said loop including only one transmission segment for which virtual transmission delay ins unknown to said central service node.

19. The network of claim 18 wherein:
(a) said control message set further includes a signal message designed to propagate through any loop to which it is directed; and
(b) said control logic of the central service node further includes means for (1) resetting and starting said round-trip delay counter at a nodal time corresponding to the reference time of transmission of said pass-through signal message, (2) stopping said round-trip delay counter at a nodal time corresponding to the capture of said pass-through signal message upon its return to the central service node via said loop, said counter thereby latching an elapsed-time count corresponding to the round-trip propagation time of said pass-through signal message in traversing said loop, and (3) calculating the existing exposure of any particular transmission segment within said loop, using said elapsed-time count, the known pass-through delays of said loop, and the known exposures at all other transmission segments of said loop.

* * * * *